(12) United States Patent
Hsu et al.

(10) Patent No.: US 8,817,386 B2
(45) Date of Patent: Aug. 26, 2014

(54) IMAGE CAPTURING LENS SYSTEM

(75) Inventors: Chih-Wen Hsu, Taichung (TW);
Tsung-Han Tsai, Taichung (TW);
Ming-Ta Chou, Taichung (TW)

(73) Assignee: Largan Precision Co., Ltd, Taichung (TW)

( * ) Notice: Subject to any disclaimer, the term of this patent is extended or adjusted under 35 U.S.C. 154(b) by 254 days.

(21) Appl. No.: 13/403,099

(22) Filed: Feb. 23, 2012

(65) Prior Publication Data

US 2013/0063827 A1    Mar. 14, 2013

(30) Foreign Application Priority Data

Sep. 13, 2011 (TW) .............................. 100132823 A

(51) Int. Cl.
*G02B 13/18* (2006.01)
*G02B 9/34* (2006.01)
*G02B 13/00* (2006.01)

(52) U.S. Cl.
CPC ................ *G02B 13/004* (2013.01); *G02B 9/34* (2013.01)
USPC ............................ 359/715; 359/772; 359/773

(58) Field of Classification Search
CPC .............. G02B 9/34; G02B 9/60; G02B 9/62; G02B 9/64; G02B 13/004; G02B 13/0045
USPC ................................. 359/715, 773
See application file for complete search history.

(56) References Cited

U.S. PATENT DOCUMENTS

| 7,365,920 | B2 | 4/2008 | Noda | |
|---|---|---|---|---|
| 7,965,454 | B2 * | 6/2011 | Tanaka et al. | 359/754 |
| 8,358,473 | B2 * | 1/2013 | Tang et al. | 359/715 |
| 2010/0220229 | A1 * | 9/2010 | Sano | 348/340 |
| 2012/0194920 | A1 * | 8/2012 | Huang | 359/714 |

FOREIGN PATENT DOCUMENTS

| JP | 2010008660 A | 1/2010 |
|---|---|---|
| TW | 200949336 A | 12/2009 |

* cited by examiner

*Primary Examiner* — Jordan Schwartz
(74) *Attorney, Agent, or Firm* — Morris Manning & Martin LLP; Tim Tingkang Xia, Esq.

(57) ABSTRACT

This invention provides an image capturing lens system in order from an object side to an image side comprising four non-cemented lens elements with refractive power: a first lens element with positive refractive power having a convex object-side surface; a second lens element with negative refractive power having a concave image-side surface; a plastic third lens element having a concave object-side surface and a convex image-side surface, both the object-side and image-side surfaces thereof being aspheric; and a plastic fourth lens element with negative refractive power having a concave image-side surface, both the object-side and image-side surfaces thereof being aspheric, and at least one inflection point is formed on at least one of the object-side and image-side surfaces thereof; wherein the image capturing lens system comprises a stop positioned between the first lens element and the second lens element.

24 Claims, 22 Drawing Sheets

IMAGE CAPTURING LENS SYSTEM

CROSS-REFERENCE TO RELATED APPLICATIONS

This non-provisional application claims priority under 35 U.S.C. §119(a) on Patent Application No. 100132823 filed in Taiwan, R.O.C. on Sep. 13, 2011, the entire contents of which are hereby incorporated by reference.

BACKGROUND OF THE INVENTION

1. Field of the Invention

The present invention relates to an image capturing lens system, and more particularly, to a compact image capturing lens system used in electronic products.

2. Description of the Prior Art

In recent years, with the popularity of portable electronic products having photographing function, the demand of compact imaging lens system has grown. Generally, the sensor of a general photographing camera is none other than CCD (Charge Coupled Device) or CMOS device (Complementary Metal Oxide Semiconductor device). Furthermore, advances in semiconductor manufacturing technology have allowed the pixel size of sensors to be reduced and therefore lead compact imaging lens systems to higher resolution. In the meantime, the demand for better image quality is also increased.

A conventional imaging lens system with high resolving power, such as the one set forth in U.S. Pat. No. 7,365,920, generally has a front stop and four lens elements; wherein, the first and second lens elements are adhered together to form a doublet for correcting the chromatic aberration. However, this kind of arrangement has the following disadvantages. First, the degree of freedom in arranging the lens system is curtailed due to the employment of excessive number of spherical glass lenses; thus, the total track length of the system cannot be reduced easily. Second, the process of adhering glass lenses together is complicated, posing difficulties in manufacturing. Moreover, the popularity of high-class portable devices such as Smart Phone and PDA (Personal Digital Assistant) drives the rapid improvements in high resolution and image quality of the current compact imaging lens systems, conventional four lens elements systems no longer satisfy the higher level camera modules.

Inasmuch as the foregoing, a need is continuously existed for a lens system with good image quality and moderate total track length and is suitable for compact and portable electronic products.

SUMMARY OF THE INVENTION

The present invention provides an image capturing lens system, in order from an object side to an image side comprising four non-cemented lens elements with refractive power: a first lens element with positive refractive power having a convex object-side surface; a second lens element with negative refractive power having a concave image-side surface; a plastic third lens element having a concave object-side surface and a convex image-side surface, both the object-side and image-side surfaces thereof being aspheric; and a plastic fourth lens element with negative refractive power having a concave image-side surface, both the object-side and image-side surfaces thereof being aspheric, and at least one inflection point is formed on at least one of the object-side and image-side surfaces thereof; wherein the image capturing lens system comprises a stop positioned between the first lens element and the second lens element; wherein an axial distance between the third lens element and the fourth lens element is T34, a central thickness of the third lens element is CT3, a central thickness of the fourth lens element is CT4, an axial distance between the object-side surface of the first lens element and the stop is Ds, an axial distance between the object-side surface of the first lens element and the image-side surface of the second lens element is D12, and they satisfy the following relations: $1.1 < T34/CT3 < 3.3$; $0.8 < T34/CT4 < 3.5$; and $0.35 < Ds/D12 < 0.9$.

On the other hand, the present invention provides an image capturing lens system, in order from an object side to an image side comprising four non-cemented lens elements with refractive power: a first lens element with positive refractive power having a convex object-side surface; a second lens element with negative refractive power having a concave object-side surface and a concave image-side surface; a plastic third lens element having a concave object-side surface and a convex image-side surface, both the object-side and image-side surfaces thereof being aspheric; and a plastic fourth lens element with negative refractive power having a concave object-side surface and a concave image-side surface, both the object-side and image-side surfaces thereof being aspheric, and at least one inflection point is formed on at least one of the object-side and image-side surfaces thereof; wherein an axial distance between the third lens element and the fourth lens element is T34, a central thickness of the third lens element is CT3, a curvature radius of the image-side surface of the fourth lens element is R8, a curvature radius of the object-side surface of the fourth lens element is R7, a central thickness of the first lens element is CT1, a central thickness of the second lens element is CT2, and they satisfy the following relations: $1.1 < T34/CT3 < 3.3$; $-2.0 < R8/R7 < 0$; and $1.0 < CT1/CT2 < 4.5$.

Furthermore, the present invention provides an image capturing lens system, in order from an object side to an image side comprising four non-cemented lens elements with refractive power: a first lens element with positive refractive power having a convex object-side surface; a second lens element with negative refractive power having a concave object-side surface and a concave image-side surface; a plastic third lens element having a concave object-side surface and a convex image-side surface, both the object-side and image-side surfaces thereof being aspheric; and a plastic fourth lens element with negative refractive power having a concave object-side surface and a concave image-side surface, both the object-side and image-side surfaces thereof being aspheric, and at least one inflection point is formed on at least one of the object-side and image-side surfaces thereof; wherein the image capturing lens system comprises a stop positioned between the first lens element and the second lens element; wherein an axial distance between the third lens element and the fourth lens element is T34, a central thickness of the third lens element is CT3, a central thickness of the first lens element is CT1, a central thickness of the second lens element is CT2, an axial distance between the object-side surface of the first lens element and the stop is Ds, an axial distance between the object-side surface of the first lens element and the image-side surface of the second lens element is D12, and they satisfy the following relations: $1.1 < T34/CT3 < 3.3$; $1.0 < CT1/CT2 < 4.5$; and $0.35 < Ds/D12 < 0.9$.

By such arrangement, not only the photosensitivity and total track length of the system can be reduced, but also better image quality can be obtained.

In the aforementioned image capturing lens system, the first lens element has positive refractive power and thereby can provide significant refractive power needed for the system and is favorable for reducing the total track length thereof. When the second lens element has negative refractive power, the aberration produced by the first lens element with positive refractive power can be effectively corrected. When the fourth lens element has negative refractive power, the principal point of the system can be positioned away from the image plane so that the total track length of the system can be favorably shortened for keeping the system compact.

In the aforementioned image capturing lens system, the first lens element can be a bi-convex lens element or a meniscus lens element having a convex object-side surface and a concave image-side surface. When the first lens element is a bi-convex lens element, the refractive power of the first lens element can be strengthened for reducing the total track length of the system. When the first lens element is a convex-concave meniscus lens element, it is favorable for correcting the astigmatism of the system. When the second lens element has a concave image-side surface, the back focal length can be effectively enlarged for sure that there is enough back focal length for positioning other elements. When the second lens element has a concave object-side surface and a concave image-side surface, the aberration and the chromatic aberration of the system can be effectively corrected with the negative refractive power thereof. When the third lens element has a concave object-side surface and a convex image-side surface, the astigmatism of the system can be favorably corrected. When the fourth lens element has a concave image-side surface, the principal point of the system can be positioned away from the image plane, and the back focal length of the system is favorably reduced. Furthermore, when at least one inflection is formed on the fourth lens element, the angle at which light projects onto the image sensor from the off-axis field can be effectively reduced so that the sensing efficiency of the image sensor can be improved and the off-axis aberration can be corrected.

DETAILED DESCRIPTION OF THE PREFERRED EMBODIMENTS

Figure 1A:
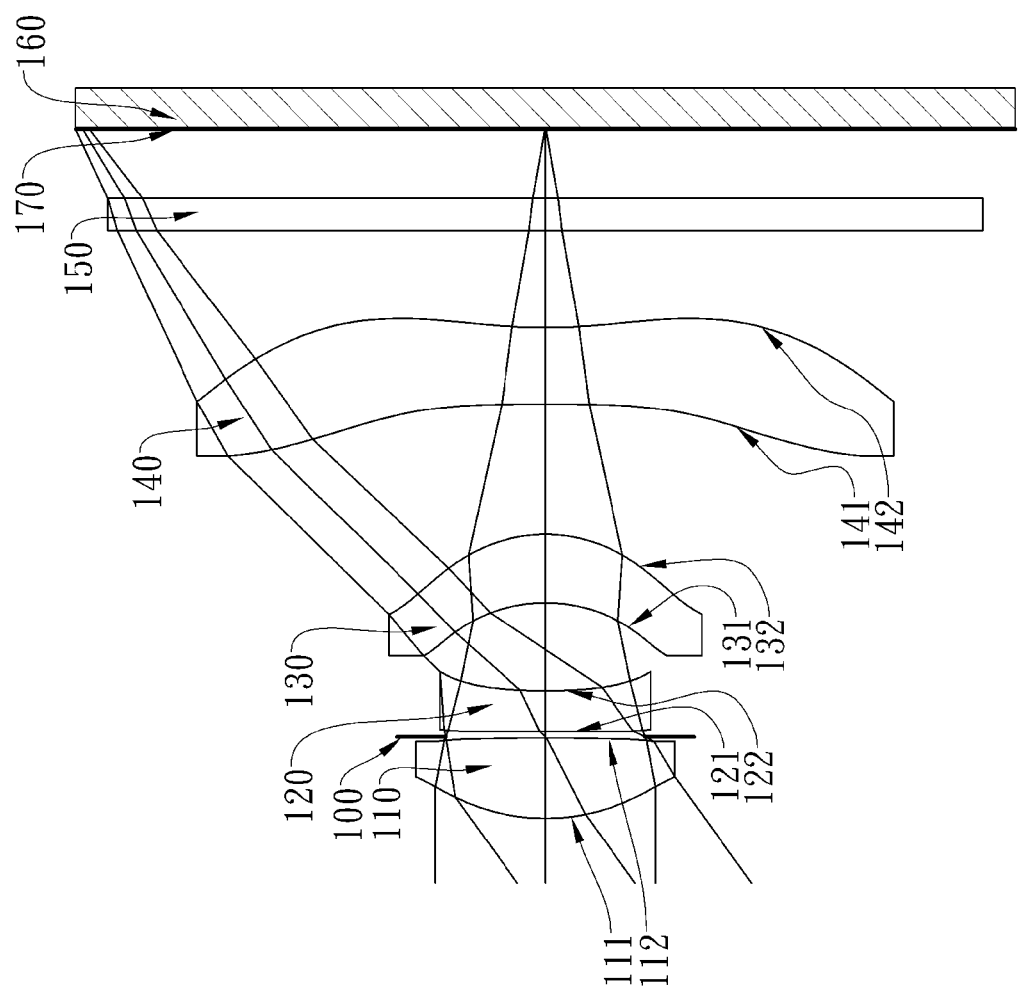
FIG. 1A shows an image capturing lens system in accordance with a first embodiment of the present invention.

The present invention provides an image capturing lens system, in order from an object side to an image side comprising four non-cemented lens elements with refractive power: a first lens element with positive refractive power having a convex object-side surface; a second lens element with negative refractive power having a concave image-side surface; a plastic third lens element having a concave object-side surface and a convex image-side surface, both the object-side and image-side surfaces thereof being aspheric; and a plastic fourth lens element with negative refractive power having a concave image-side surface, both the object-side and image-side surfaces thereof being aspheric, and at least one inflection point is formed on at least one of the object-side and image-side surfaces thereof; wherein the image capturing lens system comprises a stop positioned between the first lens element and the second lens element; wherein an axial distance between the third lens element and the fourth lens element is T34, a central thickness of the third lens element is CT3, a central thickness of the fourth lens element is CT4, an axial distance between the object-side surface of the first lens element and the stop is Ds, an axial distance between the object-side surface of the first lens element and the image-side surface of the second lens element is D12, and they satisfy the following relations: $1.1 < T34/CT3 < 3.3$; $0.8 < T34/CT4 < 3.5$; and $0.35 < Ds/D12 < 0.9$.

When the relation of $1.1 < T34/CT3 < 3.3$ is satisfied, the ratio of the distance between the third lens element and the fourth lens element and the thickness of the third lens element is more suitable, and thereby the image quality of the system can be improved without making the total track length thereof excessively long.

When the relation of $0.8 < T34/CT4 < 3.5$ is satisfied, the ratio of the distance between the third lens element and the fourth lens element and the thickness of the fourth lens element is more suitable, and thereby the image quality of the system can be improved without making the total track length thereof excessively long.

When the relation of $0.35 < Ds/D12 < 0.9$ is satisfied, the relative position of the stop and the nearby lens elements thereof can be effectively controlled for arrangement and assembly of the lens elements and the stop.

In the aforementioned image capturing lens system, a central thickness of the first lens element is CT1, a central thickness of the second lens element is CT2, and they preferably satisfy the following relation: $1.0 < CT1/CT2 < 4.5$. When the above relation is satisfied, the thickness of the first lens element and the second lens element is more suitable for space arrangement and assembly of the lens system.

In the aforementioned image capturing lens system, an Abbe number of the first lens element is V1, an Abbe number of the second lens element is V2, and they preferably satisfy the following relation: 30<V1−V2<42. When the above relation is satisfied, the chromatic aberration of the system can be favorably corrected.

In the aforementioned image capturing lens system, a curvature radius of the image-side surface of the first lens element is R2, a focal length of the image capturing lens system is f, and they preferably satisfy the following relation: R2/f<2.0. When the above relation is satisfied, the field of view can be favorably enlarged.

In the aforementioned image capturing lens system, a curvature radius of the image-side surface of the fourth lens element is R8, a curvature radius of the object-side surface of the fourth lens element is R7, and they preferably satisfy the following relation: −2.0<R8/R7<0. When the above relation is satisfied, the fourth lens element can provide sufficient negative refractive power for favorably correcting the aberration of the system as well as improving the resolution thereof; more preferably, the following relation is satisfied: −0.5<R8/R7<0.

In the aforementioned image capturing lens system, the system further comprises an image plane, an axial distance between the object-side surface of the first lens element and the image plane is TTL, the maximum image height of the image capturing lens system is ImgH, and they preferably satisfy the following relation: TTL/ImgH<1.9. When the above relation is satisfied, it is favorable for keeping the system compact in order to be equipped on portable electronic products.

In the aforementioned image capturing lens system, a focal length of the image capturing lens system is f, a curvature radius of the object-side surface of the second lens element is R3, and they preferably satisfy the following relation: −1.3<f/R3<0. When the above relation is satisfied, the back focal length can be effectively enlarged to ensure sufficient back focal length for positioning other elements.

In the aforementioned image capturing lens system, a focal length of the image capturing lens system is f, a focal length of the third lens element is f3, and they preferably satisfy the following relation: |f/f3|<0.8. When the above relation is satisfied, the configuration of the refractive power of the third lens element is more suitable for distributing the required refractive power of the system with the first lens element favorably. Therefore, it avoids any lens element having too large refractive power so that the sensitivity of the system can be effectively reduced. More preferably, the following relation is satisfied: 0.3<|f/f3|<0.8.

On the other hand, the present invention provides an image capturing lens system, in order from an object side to an image side comprising four non-cemented lens elements with refractive power: a first lens element with positive refractive power having a convex object-side surface; a second lens element with negative refractive power having a concave object-side surface and a concave image-side surface; a plastic third lens element having a concave object-side surface and a convex image-side surface, both the object-side and image-side surfaces thereof being aspheric; and a plastic fourth lens element with negative refractive power having a concave object-side surface and a concave image-side surface, both the object-side and image-side surfaces thereof being aspheric, and at least one inflection point is formed on at least one of the object-side and image-side surfaces thereof; wherein an axial distance between the third lens element and the fourth lens element is T34, a central thickness of the third lens element is CT3, a curvature radius of the image-side surface of the fourth lens element is R8, a curvature radius of the object-side surface of the fourth lens element is R7, a central thickness of the first lens element is CT1, a central thickness of the second lens element is CT2, and they satisfy the following relations: 1.1<T34/CT3<3.3; −2.0<R8/R7<0; and 1.0<CT1/CT2<4.5.

When the relation of 1.1<T34/CT3<3.3 is satisfied, the ratio of the distance between the third lens element and the fourth lens element and the thickness of the third lens element is more suitable, and thereby the image quality of the system can be improved without making the total track length thereof excessively long.

When the relation of −2.0<R8/R7<0 is satisfied, the fourth lens element can provide sufficient negative refractive power for favorably correcting the aberration of the system as well as improving the resolution thereof; more preferably, the following relation is satisfied: −0.5<R8/R7<0.

When the relation of 1.0<CT1/CT2<4.5 is satisfied, the thickness of the first lens element and the second lens element is more suitable for space arrangement and assembly of the lens system.

In the aforementioned image capturing lens system, an axial distance between the third lens element and the fourth lens element is T34, a central thickness of the fourth lens element is CT4, and they preferably satisfy the following relation: 0.8<T34/CT4<3.5. When the above relation is satisfied, the ratio of the distance between the third lens element and the fourth lens element and the thickness of the fourth lens element is more suitable, and thereby the image quality of the system can be improved without making the total track length thereof excessively long.

In the aforementioned image capturing lens system, an axial distance between the object-side surface of the first lens element and the stop is Ds, an axial distance between the object-side surface of the first lens element and the image-side surface of the second lens element is D12, and they preferably satisfy the following relation: 0.35<Ds/D12<0.9. When the above relation is satisfied, the relative position of the stop and the nearby lens elements thereof can be effectively controlled for arrangement and assembly of the lens elements and the stop.

In the aforementioned image capturing lens system, a focal length of the image capturing lens system is f, a focal length of the third lens element is f3, and they preferably satisfy the following relation: 0.3<|f/f3|<0.8. When the above relation is satisfied, the configuration of the refractive power of the third lens element is more suitable for distributing the required refractive power of the system with the first lens element favorably. Therefore, it avoids any lens element having too large refractive power so that the sensitivity of the system can be effectively reduced.

Furthermore, the present invention provides an image capturing lens system, in order from an object side to an image side comprising four non-cemented lens elements with refractive power: a first lens element with positive refractive power having a convex object-side surface; a second lens element with negative refractive power having a concave object-side surface and a concave image-side surface; a plastic third lens element having a concave object-side surface and a convex image-side surface, both the object-side and image-side surfaces thereof being aspheric; and a plastic fourth lens element with negative refractive power having a concave object-side surface and a concave image-side surface, both the object-side and image-side surfaces thereof being aspheric, and at least one inflection point is formed on at least one of the object-side and image-side surfaces thereof; wherein the image capturing lens system comprises a stop positioned between the first lens element and the second lens element; wherein an axial distance between the third lens element and the fourth lens element is T34, a central thickness of the third lens element is CT3, a central thickness of the first lens element is CT1, a central thickness of the second lens element is CT2, an axial distance between the object-side surface of the first lens element and the stop is Ds, an axial distance between the object-side surface of the first lens element and the image-side surface of the second lens element is D12, and they satisfy the following relations: 1.1<T34/CT3<3.3; 1.0<CT1/CT2<4.5; and 0.35<Ds/D12<0.9.

When the relation of 1.1<T34/CT3<3.3 is satisfied, the ratio of the distance between the third lens element and the fourth lens element and the thickness of the third lens element is more suitable, and thereby the image quality of the system can be improved without making the total track length thereof excessively long.

When the relation of 1.0<CT1/CT2<4.5 is satisfied, the thickness of the first lens element and the second lens element is more suitable for space arrangement and assembly of the lens system.

When the relation of 0.35<Ds/D12<0.9 is satisfied, the relative position of the stop and the nearby lens elements thereof can be effectively controlled for arrangement and assembly of the lens elements and the stop.

In the aforementioned image capturing lens system, an Abbe number of the first lens element is V1, an Abbe number of the second lens element is V2, and they preferably satisfy the following relation: 30<V1−V2<42. When the above relation is satisfied, the chromatic aberration of the system can be favorably corrected.

In the aforementioned image capturing lens system, a curvature radius of the image-side surface of the fourth lens element is R8, a curvature radius of the object-side surface of the fourth lens element is R7, and they preferably satisfy the following relation: −2.0<R8/R7<0. When the above relation is satisfied, the fourth lens element can provide sufficient negative refractive power for favorably correcting the aberration of the system as well as improving the resolution thereof.

In the aforementioned image capturing lens system, an axial distance between the third lens element and the fourth lens element is T34, a central thickness of the fourth lens element is CT4, and they preferably satisfy the following relation: 0.8<T34/CT4<3.5. When the above relation is satisfied, the ratio of the distance between the third lens element and the fourth lens element and the thickness of the fourth lens element is more suitable, and thereby the image quality of the system can be improved without making the total track length thereof excessively long.

In the aforementioned image capturing lens system, the system further comprises an image plane, an axial distance between the object-side surface of the first lens element and the image plane is TTL, the maximum image height of the image capturing lens system is ImgH, and they preferably satisfy the following relation: TTL/ImgH<1.9. When the above relation is satisfied, it is favorable for keeping the system compact in order to be equipped on portable electronic products.

In the aforementioned image capturing lens system, the lens elements can be made of glass or plastic material. If the lens elements are made of glass, the freedom for distributing the refractive power of the image capturing lens system can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements used in an optical system. Consequently, the total track length of the image capturing lens system can be effectively reduced.

In the present image capturing lens system, if a lens element has a convex surface, it means the portion of the surface in proximity to the optical axis is convex; if a lens element has a concave surface, it means the portion of the surface in proximity to the optical axis is concave.

In the present image capturing lens system, there can be at least one stop, such as a glare stop or a field stop, provided for eliminating stray light and thereby promoting image resolution thereof.

Preferred embodiments of the present invention will be described in the following paragraphs by referring to the accompanying drawings.

Embodiment 1

Figure 1B:
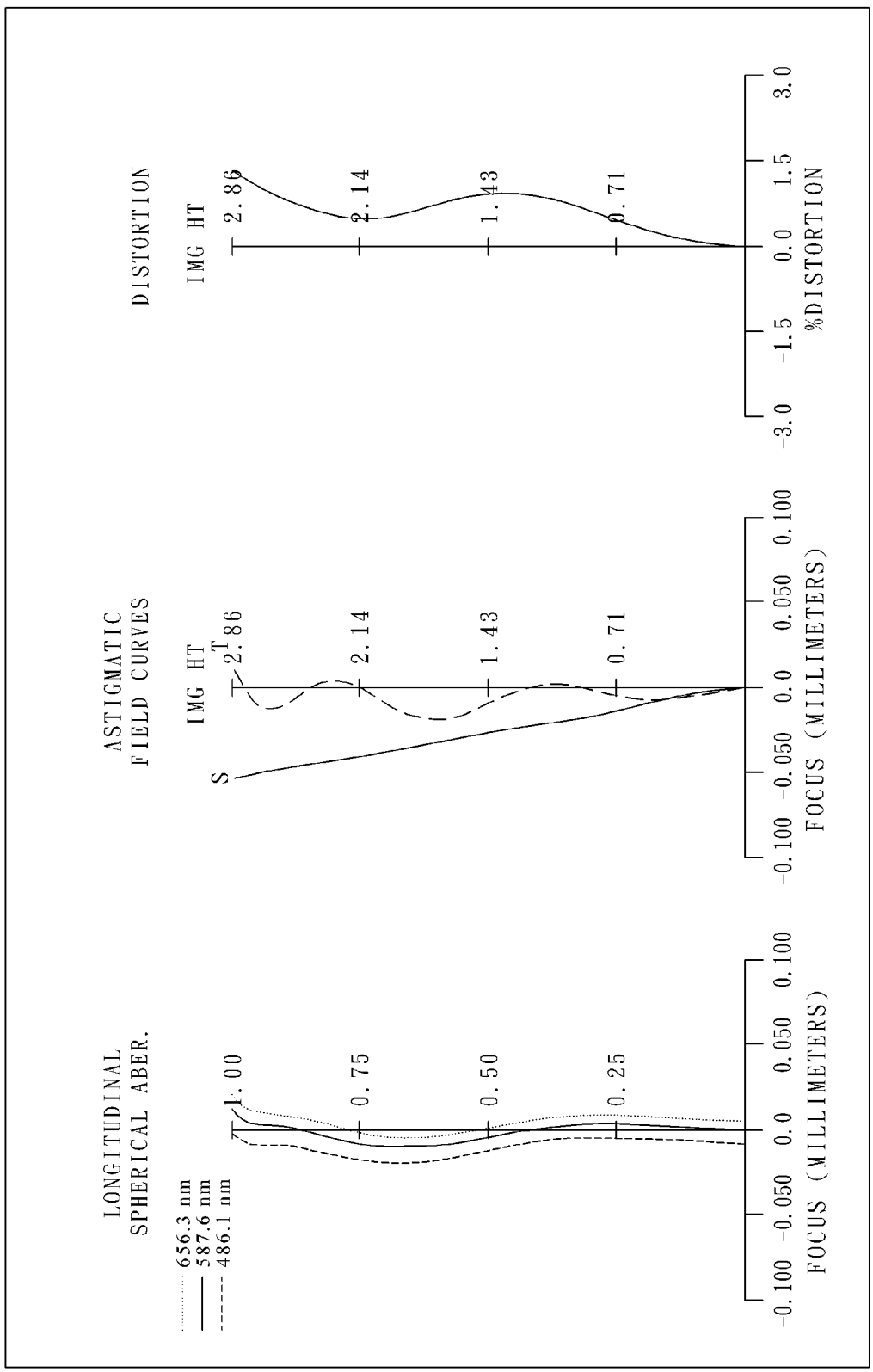
FIG. 1B shows the aberration curves of the first embodiment of the present invention.

FIG. 1A shows an image capturing lens system in accordance with the first embodiment of the present invention, and FIG. 1B shows the aberration curves of the first embodiment of the present invention. The image capturing lens system of the first embodiment of the present invention mainly comprises four non-cemented lens elements, in order from an object side to an image side:

a first lens element 110 made of plastic with positive refractive power having a convex object-side surface 111 and a convex image-side surface 112, the object-side and image-side surfaces 111 and 112 thereof being aspheric;

a second lens element 120 made of plastic with negative refractive power having a concave object-side surface 121 and a concave image-side surface 122, the object-side and image-side surfaces 121 and 122 thereof being aspheric;

a third lens element 130 made of plastic with positive refractive power having a concave object-side surface 131 and a convex image-side surface 132, the object-side and image-side surfaces 131 and 132 thereof being aspheric; and a fourth lens element 140 made of plastic with negative refractive power having a concave object-side surface 141 and a concave image-side surface 142, the object-side and image-side surfaces 141 and 142 thereof being aspheric, and at least one inflection point is formed on both the object-side surface 141 and the image-side surface 142 thereof;

wherein a stop, such as an aperture stop 100 is disposed between the first lens element 110 and the second lens element 120;

the image capturing lens system further comprises an IR filter 150 disposed between the image-side surface 142 of the fourth lens element 140 and an image plane 170, and the IR filter 150 is made of glass and has no influence on the focal length of the image capturing lens system; the image capturing lens system further comprises an image sensor 160 provided on the image plane 170.

The detailed optical data of the first embodiment is shown in TABLE 1, and the aspheric surface data is shown in TABLE 2, wherein the units of the radius of curvature, the thickness and the focal length are expressed in mm, and HFOV is half of the maximal field of view.

TABLE 1

(Embodiment 1)
f = 3.91 mm, Fno = 2.88, HFOV = 35.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.224450 | (ASP) | 0.495 | Plastic | 1.544 | 55.9 | 2.14 |
| 2 | | −20.685000 | (ASP) | 0.007 | | | | |
| 3 | Ape. Stop | Plano | | 0.036 | | | | |
| 4 | Lens 2 | −11.296600 | (ASP) | 0.250 | Plastic | 1.640 | 23.3 | −4.00 |
| 5 | | 3.337100 | (ASP) | 0.544 | | | | |
| 6 | Lens 3 | −0.995690 | (ASP) | 0.423 | Plastic | 1.544 | 55.9 | 7.30 |
| 7 | | −0.915280 | (ASP) | 0.804 | | | | |
| 8 | Lens 4 | −50.000000 | (ASP) | 0.473 | Plastic | 1.535 | 56.3 | −5.34 |
| 9 | | 3.037600 | (ASP) | 0.600 | | | | |
| 10 | IR-filter | Plano | | 0.200 | Glass | 1.516 | 64.1 | — |
| 11 | | Plano | | 0.428 | | | | |
| 12 | Image | Plano | | — | | | | |

* Reference wavelength is 587.6 nm (d-line)

TABLE 2

Aspheric Coefficients

| | Surface # | | | | | | | |
|---|---|---|---|---|---|---|---|---|
| | 1 | 2 | 4 | 5 | 6 | 7 | 8 | 9 |
| k = | −4.82162E+00 | 1.00000E+00 | 0.00000E+00 | −1.00000E+01 | −3.72766E−01 | −7.02416E−01 | 1.00000E+00 | −6.79071E−01 |
| A4 = | 3.01987E−01 | −7.12175E−03 | 1.61443E−01 | 2.58789E−01 | −1.27306E−01 | −5.43513E−02 | −1.15041E−01 | −1.57283E−01 |
| A6 = | −1.89694E−01 | 3.66098E−02 | −7.21700E−02 | 2.09294E−02 | −4.51498E−01 | 4.02235E−02 | 3.44071E−02 | 6.40563E−02 |
| A8 = | −1.08638E−01 | −5.99575E−01 | 6.83675E−01 | 4.05638E−01 | 7.55067E−01 | −4.30012E−01 | 7.55486E−03 | −2.42831E−02 |
| A10 = | 3.33610E−01 | 1.86575E+00 | −2.70255E+00 | −5.81867E−01 | 5.99779E−01 | 8.66152E−01 | −6.05383E−03 | 6.33428E−03 |
| A12 = | −2.82679E−01 | −3.76555E+00 | 5.58660E+00 | 1.63902E+00 | −6.24047E−01 | −1.48049E−01 | 1.22439E−03 | −9.29182E−04 |
| A14 = | −4.57314E−01 | 2.83060E+00 | −4.36921E+00 | −8.57245E−01 | 9.08742E−01 | −4.98600E−02 | −8.50716E−05 | 5.69282E−05 |
| A16 = | 1.73626E−01 | −1.37294E−09 | −7.14981E−04 | 1.23986E−04 | −2.18203E−05 | −1.34079E−01 | | |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the distance of a point on the aspheric surface at a distance Y from the optical axis relative to the tangential plane at the aspheric surface vertex;

Y: the distance from the point on the curve of the aspheric surface to the optical axis;

R: curvature radius k: the conic coefficient;

Ai: the aspheric coefficient of order i.

In the first embodiment of the present image capturing lens system, the focal length of the image capturing lens system is f, and it satisfies the following relation: f=3.91 (mm).

In the first embodiment of the present image capturing lens system, the f-number of the image capturing lens system is Fno, and it satisfies the relation: Fno=2.88.

In the first embodiment of the present image capturing lens system, half of the maximal field of view of the image capturing lens system is HFOV, and it satisfies the relation: HFOV=35.9 deg.

In the first embodiment of the present image capturing lens system, an Abbe number of the first lens element 110 is V1, an Abbe number of the second lens element 120 is V2, and they satisfy the following relation: V1−V2=32.6.

In the first embodiment of the present image capturing lens system, the focal length of the image capturing lens system is f, a focal length of the third lens element 130 is f3, and they satisfy the following relation: |f/f3|=0.54.

In the first embodiment of the present image capturing lens system, a curvature radius of the image-side surface 112 of the first lens element 110 is R2, the focal length of the image capturing lens system is f, and they satisfy the following relation: R2/f=−5.30.

In the first embodiment of the present image capturing lens system, the focal length of the image capturing lens system is f, a curvature radius of the object-side surface 121 of the second lens element 120 is R3, and they satisfy the following relation: f/R3=−0.35.

In the first embodiment of the present image capturing lens system, an axial distance between the object-side surface 111 of the first lens element 110 and the stop 100 is Ds, an axial distance between the object-side surface 111 of the first lens element 110 and the image-side surface 122 of the second lens element 120 is D12, and they satisfy the following relation: Ds/D12=0.64.

In the first embodiment of the present image capturing lens system, an axial distance between the third lens element 130 and the fourth lens element 140 is T34, a central thickness of the third lens element 130 is CT3, and they satisfy the following relation: T34/CT3=1.90.

In the first embodiment of the present image capturing lens system, an axial distance between the third lens element 130 and the fourth lens element 140 is T34, a central thickness of the fourth lens element 140 is CT4, and they satisfy the following relation: T34/CT4=1.70.

In the first embodiment of the present image capturing lens system, a central thickness of the first lens element 110 is CT1, a central thickness of the second lens element 120 is CT2, and they satisfy the following relation: CT1/CT2=1.98.

In the first embodiment of the present image capturing lens system, a curvature radius of the image-side surface 142 of the fourth lens element 140 is R8, a curvature radius of the object-side surface 141 of the fourth lens element 140 is R7, and they satisfy the following relation: R8/R7=−0.06.

In the first embodiment of the present image capturing lens system, an axial distance between the object-side surface 111 of the first lens element 110 and the image plane 161 is TTL, the maximum image height of the image capturing lens system, which is half of a diagonal length of an effective photosensitive area of the image sensor 160 in this embodiment, is ImgH, and they satisfy the following relation: TTL/ImgH=1.47.

Embodiment 2

Figure 2A:
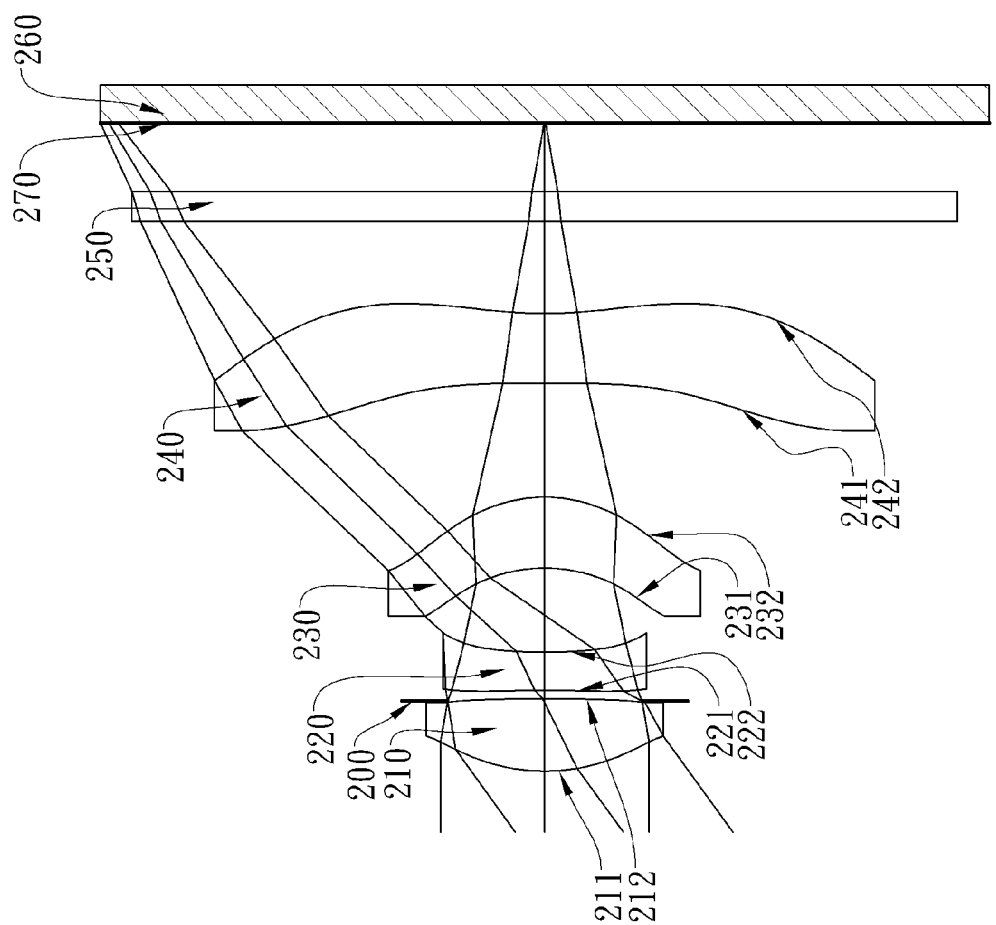
FIG. 2A shows an image capturing lens system in accordance with a second embodiment of the present invention.
Figure 2B:
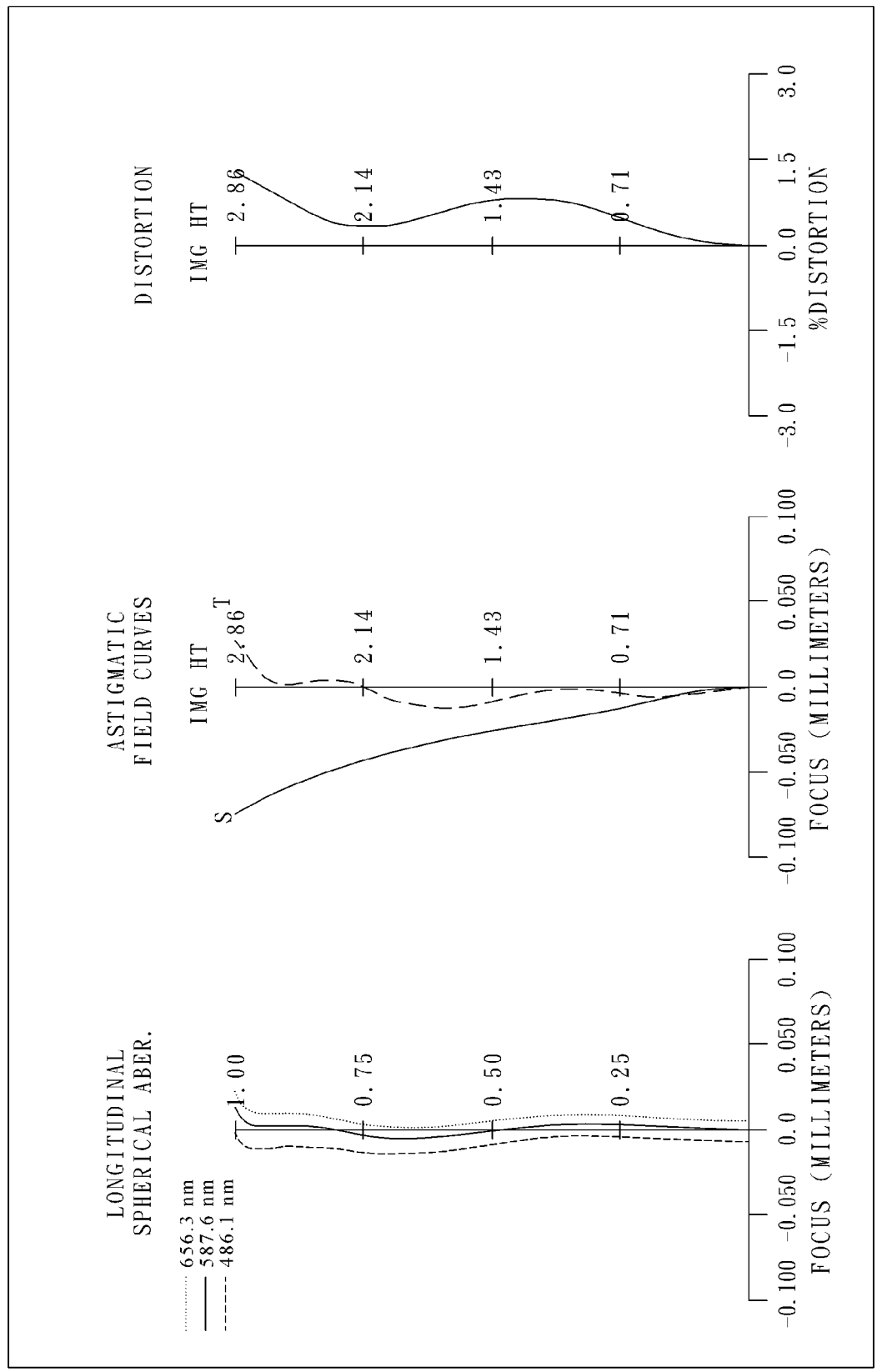
FIG. 2B shows the aberration curves of the second embodiment of the present invention.

FIG. 2A shows an image capturing lens system in accordance with the second embodiment of the present invention, and FIG. 2B shows the aberration curves of the second embodiment of the present invention. The image capturing lens system of the second embodiment of the present invention mainly comprises four non-cemented lens elements, in order from an object side to an image side:

a first lens element 210 made of plastic with positive refractive power having a convex object-side surface 211 and a convex image-side surface 212, the object-side and image-side surfaces 211 and 212 thereof being aspheric;

a second lens element 220 made of plastic with negative refractive power having a concave object-side surface 221 and a concave image-side surface 222, the object-side and image-side surfaces 221 and 222 thereof being aspheric;

a third lens element 230 made of plastic with positive refractive power having a concave object-side surface 231 and a convex image-side surface 232, the object-side and image-side surfaces 231 and 232 thereof being aspheric; and a fourth lens element 240 made of plastic with negative refractive power having a concave object-side surface 241 and a concave image-side surface 242, the object-side and image-side surfaces 241 and 242 thereof being aspheric, and at least one inflection point is formed on both the object-side surface 241 and the image-side surface 242 thereof;

wherein an aperture stop 200 is disposed between the first lens element 210 and the second lens element 220;

the image capturing lens system further comprises an IR filter 250 disposed between the image-side surface 242 of the fourth lens element 240 and an image plane 270, and the IR filter 250 is made of glass and has no influence on the focal length of the image capturing lens system; the image capturing lens system further comprises an image sensor 260 provided on the image plane 270.

The detailed optical data of the second embodiment is shown in TABLE 3, and the aspheric surface data is shown in TABLE 4, wherein the units of the radius of curvature, the thickness and the focal length are expressed in mm, and HFOV is half of the maximal field of view.

TABLE 3

(Embodiment 2)
f = 3.89 mm, Fno = 2.88, HFOV = 35.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.229700 (ASP) | 0.475 | Plastic | 1.544 | 55.9 | 2.06 |
| 2 | | −11.052700 (ASP) | −0.015 | | | | |
| 3 | Ape. Stop | Plano | 0.070 | | | | |
| 4 | Lens 2 | −6.021100 (ASP) | 0.250 | Plastic | 1.634 | 23.8 | −3.83 |
| 5 | | 4.125900 (ASP) | 0.551 | | | | |
| 6 | Lens 3 | −1.055180 (ASP) | 0.466 | Plastic | 1.544 | 55.9 | 6.91 |
| 7 | | −0.952260 (ASP) | 0.746 | | | | |
| 8 | Lens 4 | −50.000000 (ASP) | 0.459 | Plastic | 1.535 | 56.3 | −4.88 |
| 9 | | 2.759450 (ASP) | 0.600 | | | | |
| 10 | IR-filter | Plano | 0.200 | Glass | 1.516 | 64.1 | — |
| 11 | | Plano | 0.448 | | | | |
| 12 | Image | Plano | — | | | | |

* Reference wavelength is 587.6 nm (d-line)

TABLE 4

Aspheric Coefficients

| | Surface # | | | | | | |
|---|---|---|---|---|---|---|---|
| 1 | 2 | 4 | 5 | 6 | 7 | 8 | 9 |
| k = −4.75531E+00 | −3.38086E+00 | 0.00000E+00 | −1.26567E+00 | −5.40730E−01 | −8.12267E−01 | 1.00000E+00 | −1.07047E+00 |
| A4 = 2.86999E−01 | 2.58237E−02 | 2.82066E−01 | 3.20241E−01 | −1.05210E−01 | −3.38847E−02 | −1.16140E−01 | −1.68038E−01 |
| A6 = −2.09559E−01 | 2.76148E−02 | −1.82247E−01 | −5.32853E−02 | −2.70875E−01 | 5.30081E−02 | 3.44746E−02 | 6.99714E−02 |
| A8 = −1.02756E−01 | −7.70579E−01 | 6.44662E−01 | 4.07223E−01 | 6.77550E−01 | −3.29940E−01 | 7.81587E−03 | −2.57409E−02 |
| A10 = 2.91208E−01 | 1.85622E+00 | −2.81870E+00 | −4.22900E−01 | 3.61915E−02 | 7.39584E−01 | −6.06219E−03 | 6.43936E−03 |
| A12 = −3.65249E−01 | −3.55843E+00 | 5.95133E+00 | 1.25216E+00 | −3.15268E−01 | −3.03156E−01 | 1.20889E−03 | −9.03767E−04 |
| A14 = −3.58769E−01 | 2.83060E+00 | −4.36921E+00 | −8.57245E−01 | 5.69963E−01 | −5.07904E−02 | −8.33143E−05 | 5.31794E−05 |
| A16 = −1.93176E−02 | −8.29679E−11 | −7.14968E−04 | 1.23973E−04 | −2.18216E−05 | 7.98698E−03 | | |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5.

TABLE 5

(Embodiment 2)

| | | | |
|---|---|---|---|
| f | 3.90 | Ds/D12 | 0.59 |
| FNO | 2.88 | T34/CT3 | 1.60 |
| HFOV | 35.9 | T34/CT4 | 1.63 |
| V1 − V2 | 32.1 | CT1/CT2 | 1.90 |
| \|f/f3\| | 0.56 | R8/R7 | −0.06 |
| R2/f | −2.84 | TTL/ImgH | 1.46 |
| f/R3 | −0.65 | | |

Embodiment 3

Figure 3A:
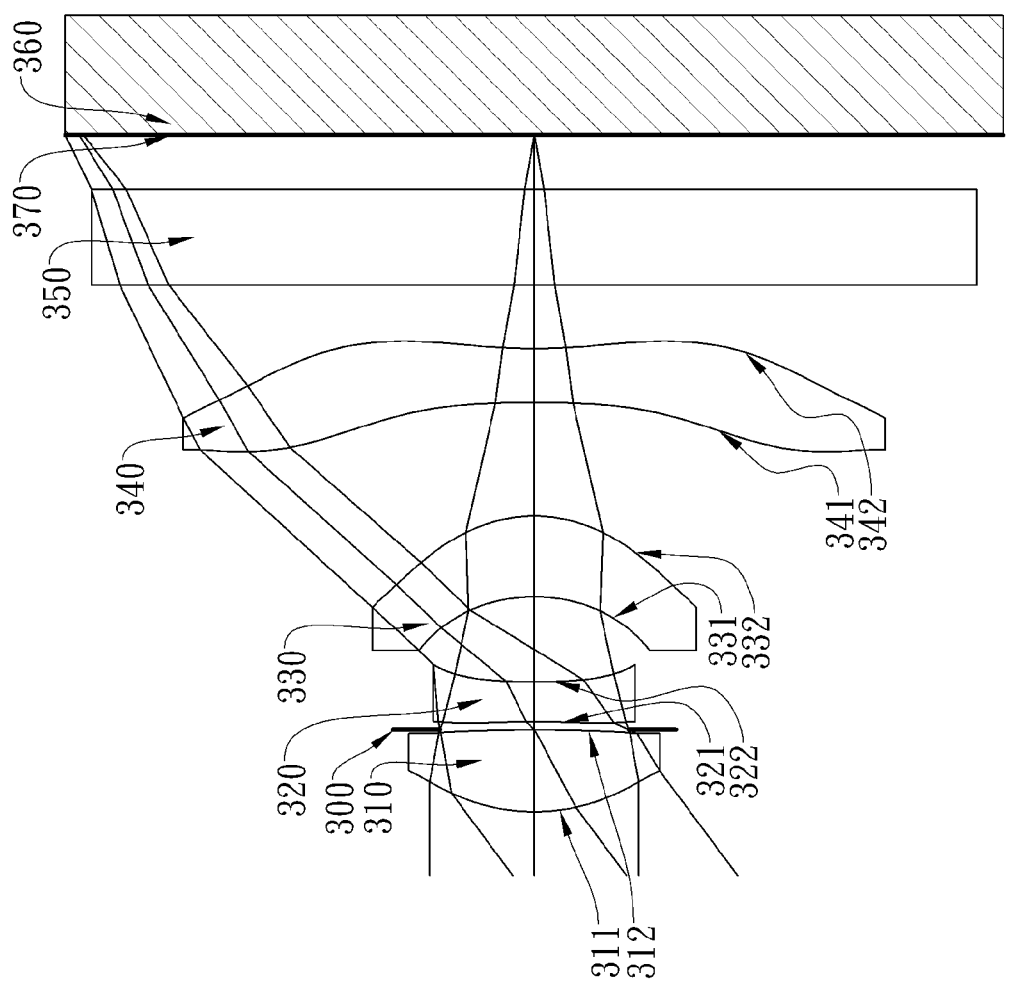
FIG. 3A shows an image capturing lens system in accordance with a third embodiment of the present invention.
Figure 3B:
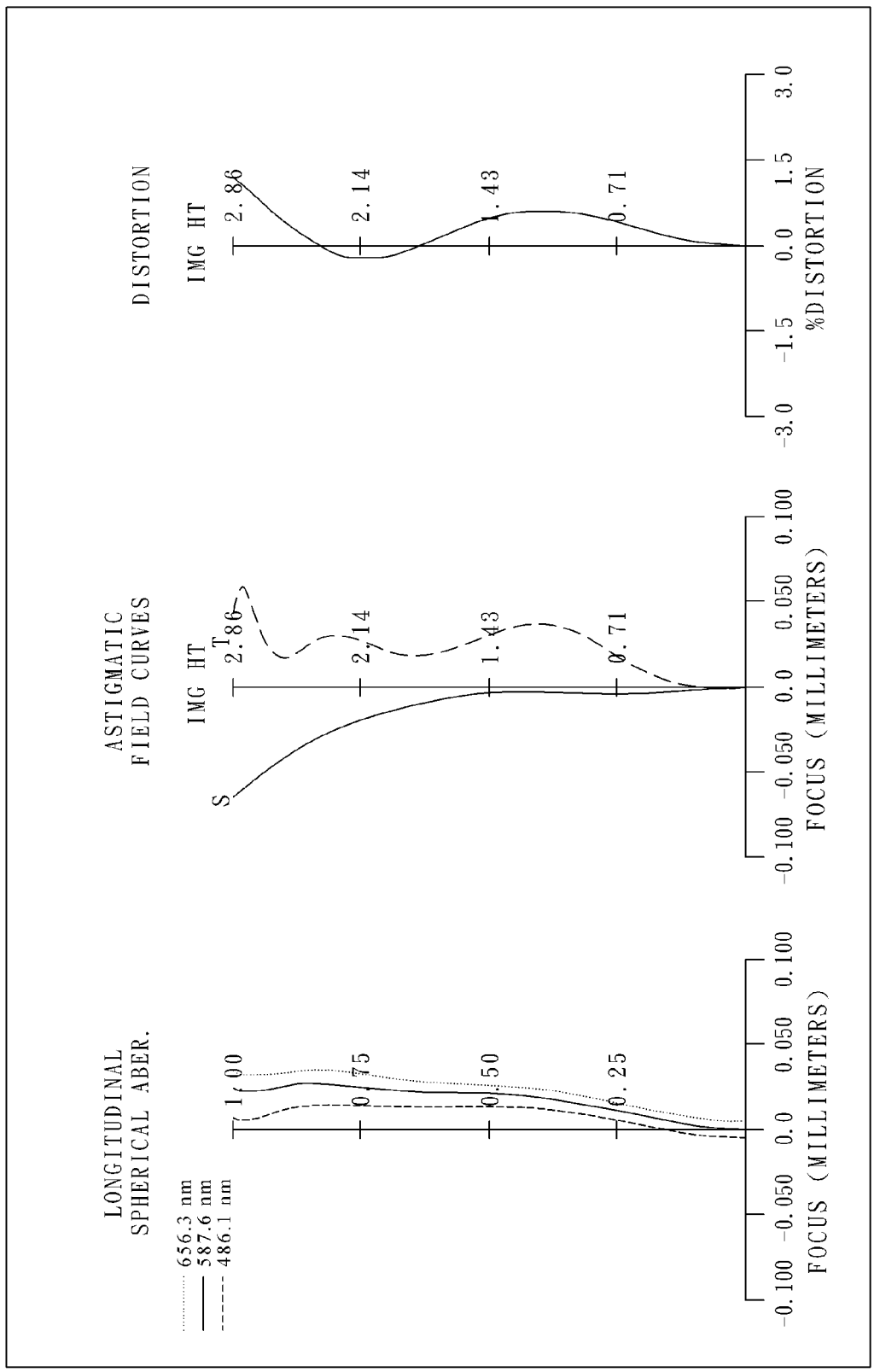
FIG. 3B shows the aberration curves of the third embodiment of the present invention.

FIG. 3A shows an image capturing lens system in accordance with the third embodiment of the present invention, and FIG. 3B shows the aberration curves of the third embodiment of the present invention. The image capturing lens system of the third embodiment of the present invention mainly comprises four non-cemented lens elements, in order from an object side to an image side:

a first lens element 310 made of plastic with positive refractive power having a convex object-side surface 311 and a convex image-side surface 312, the object-side and image-side surfaces 311 and 312 thereof being aspheric;

a second lens element 320 made of plastic with negative refractive power having a concave object-side surface 321 and a concave image-side surface 322, the object-side and image-side surfaces 321 and 322 thereof being aspheric;

a third lens element 330 made of plastic with positive refractive power having a concave object-side surface 331 and a convex image-side surface 332, the object-side and image-side surfaces 331 and 332 thereof being aspheric; and a fourth lens element 340 made of plastic with negative refractive power having a concave object-side surface 341 and a concave image-side surface 342, the object-side and image-side surfaces 341 and 342 thereof being aspheric, and at least one inflection point is formed on both the object-side surface 341 and the image-side surface 342 thereof;

wherein an aperture stop 300 is disposed between the first lens element 310 and the second lens element 320;

the image capturing lens system further comprises an IR filter 350 disposed between the image-side surface 342 of the fourth lens element 340 and an image plane 370, and the IR filter 350 is made of glass and has no influence on the focal length of the image capturing lens system; the image capturing lens system further comprises an image sensor 360 provided on the image plane 370.

The detailed optical data of the third embodiment is shown in TABLE 6, and the aspheric surface data is shown in TABLE 7, wherein the units of the radius of curvature, the thickness and the focal length are expressed in mm, and HFOV is half of the maximal field of view.

TABLE 6

(Embodiment 3)
f = 3.78 mm, Fno = 2.88, HFOV = 36.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.179150 (ASP) | 0.516 | Plastic | 1.544 | 55.9 | 1.93 |
| 2 | | −8.127200 (ASP) | 0.002 | | | | |
| 3 | Ape. Stop | Plano | 0.048 | | | | |
| 4 | Lens 2 | −4.541200 (ASP) | 0.250 | Plastic | 1.634 | 23.8 | −3.48 |
| 5 | | 4.386500 (ASP) | 0.535 | | | | |
| 6 | Lens 3 | −1.050640 (ASP) | 0.506 | Plastic | 1.544 | 55.9 | 5.98 |
| 7 | | −0.929000 (ASP) | 0.714 | | | | |
| 8 | Lens 4 | −8.632300 (ASP) | 0.338 | Plastic | 1.535 | 56.3 | −4.22 |
| 9 | | 3.095300 (ASP) | 0.400 | | | | |
| 10 | IR-filter | Plano | 0.600 | Glass | 1.516 | 64.1 | — |
| 11 | | Plano | 0.343 | | | | |
| 12 | Image | Plano | — | | | | |

* Reference wavelength is 587.6 nm (d-line)

TABLE 7

Aspheric Coefficients

| | Surface # | | | | | | | |
|---|---|---|---|---|---|---|---|---|
| | 1 | 2 | 4 | 5 | 6 | 7 | 8 | 9 |
| k = | −4.55929E+00 | −9.81109E+00 | 0.00000E+00 | −3.50582E−01 | −2.98741E−01 | −7.92197E−01 | −2.65213E+00 | −3.53009E+00 |
| A4 = | 3.14938E−01 | 9.81846E−02 | 3.97738E−01 | 3.88578E−01 | −1.70023E−01 | −4.10808E−02 | −1.05587E−01 | −1.64110E−01 |
| A6 = | −2.23212E−01 | 1.22059E−02 | −2.64111E−01 | −2.10808E−01 | −2.45176E−01 | 5.25558E−02 | 3.47181E−02 | 7.45637E−02 |
| A8 = | −8.39163E−02 | −1.22161E+00 | −1.89548E−01 | 6.34909E−01 | 9.28091E−01 | −3.38048E−01 | 8.59769E−03 | −2.84471E−02 |
| A10 = | 5.34268E−01 | 3.06922E+00 | 2.45211E−02 | −9.84493E−01 | −2.05715E+00 | 6.19035E−01 | −6.15059E−03 | 6.94840E−03 |
| A12 = | −9.85804E−01 | −4.49957E+00 | 3.23607E+00 | 2.35679E+00 | 2.76730E+00 | −2.02998E−01 | 1.15765E−03 | −8.46902E−04 |
| A14 = | 1.87632E−01 | 2.87282E+00 | −4.36902E+00 | −9.26722E−01 | −2.23239E+00 | −6.99863E−02 | −7.64029E−05 | 3.81769E−05 |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8.

TABLE 8

(Embodiment 3)

| | | | |
|---|---|---|---|
| f | 3.78 | Ds/D12 | 0.63 |
| FNO | 2.88 | T34/CT3 | 1.41 |
| HFOV | 36.6 | T34/CT4 | 2.11 |
| V1 − V2 | 32.1 | CT1/CT2 | 2.06 |
| \|f/f3\| | 0.63 | R8/R7 | −0.36 |
| R2/f | −2.15 | TTL/ImgH | 1.42 |
| f/R3 | −0.83 | | |

Embodiment 4

Figure 4A:
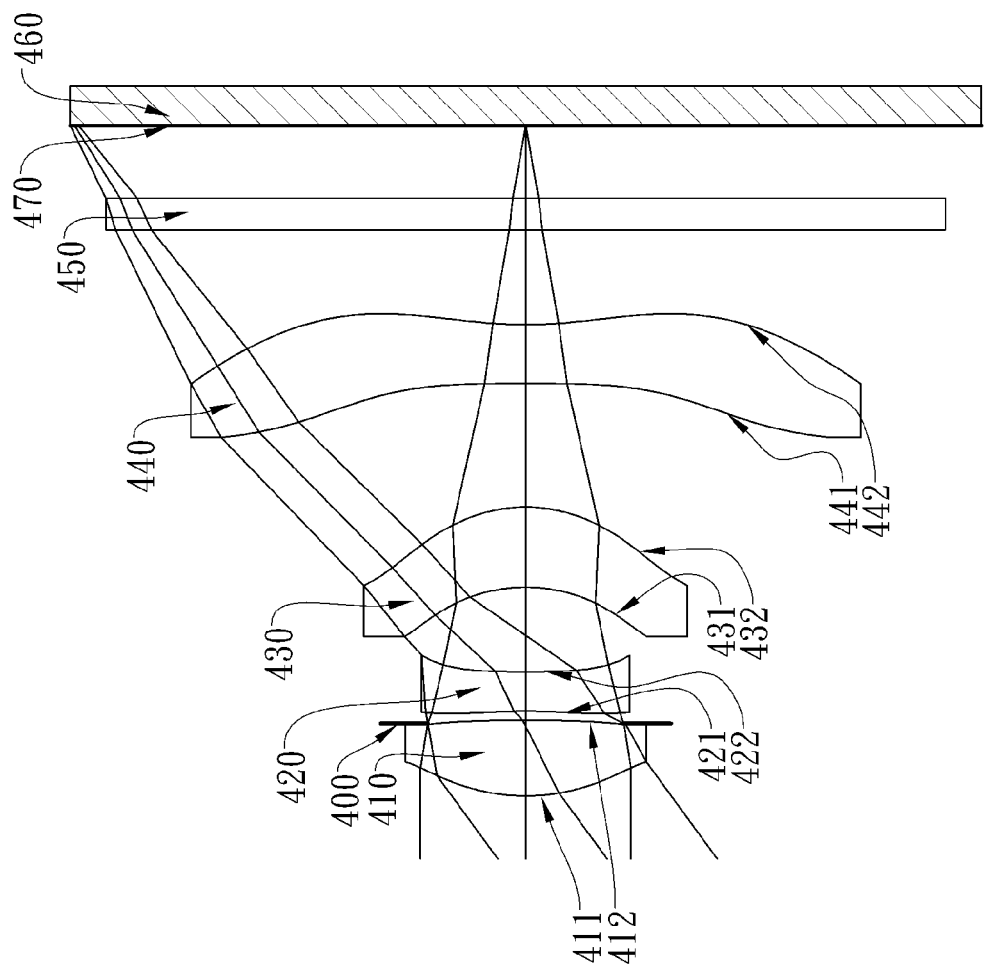
FIG. 4A shows an image capturing lens system in accordance with a fourth embodiment of the present invention.
Figure 4B:
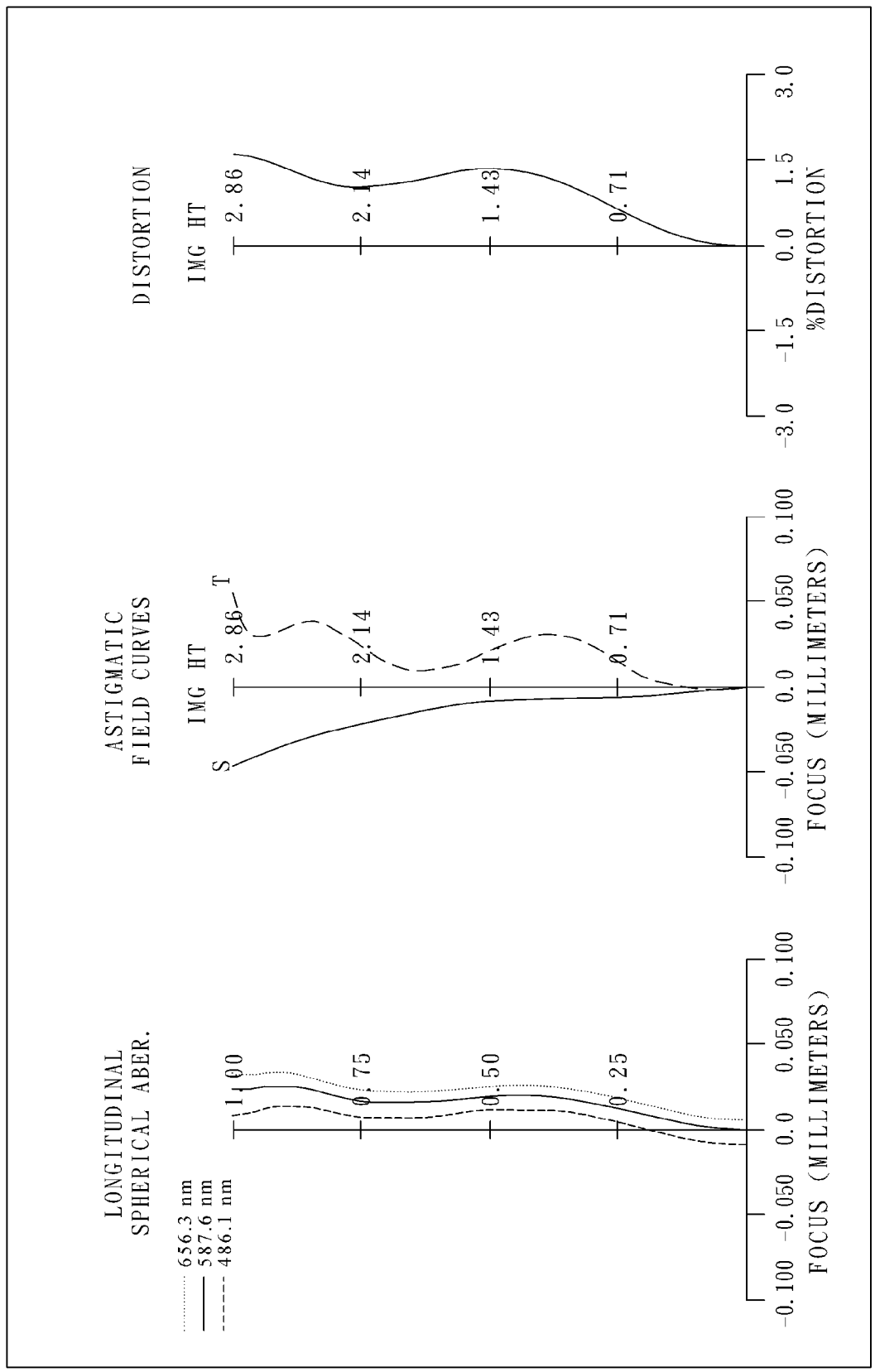
FIG. 4B shows the aberration curves of the fourth embodiment of the present invention.

FIG. 4A shows an image capturing lens system in accordance with the fourth embodiment of the present invention, and FIG. 4B shows the aberration curves of the fourth embodiment of the present invention. The image capturing lens system of the fourth embodiment of the present invention mainly comprises four non-cemented lens elements, in order from an object side to an image side:

a first lens element 410 made of plastic with positive refractive power having a convex object-side surface 411 and a convex image-side surface 412, the object-side and image-side surfaces 411 and 412 thereof being aspheric;

a second lens element 420 made of plastic with negative refractive power having a concave object-side surface 421 and a concave image-side surface 422, the object-side and image-side surfaces 421 and 422 thereof being aspheric;

a third lens element 430 made of plastic with positive refractive power having a concave object-side surface 431 and a convex image-side surface 432, the object-side and image-side surfaces 431 and 432 thereof being aspheric; and a fourth lens element 440 made of plastic with negative refractive power having a concave object-side surface 441 and a concave image-side surface 442, the object-side and image-side surfaces 441 and 442 thereof being aspheric, and at least one inflection point is formed on both the object-side surface 441 and the image-side surface 442 thereof;

wherein an aperture stop 400 is disposed between the first lens element 410 and the second lens element 420;

the image capturing lens system further comprises an IR filter 450 disposed between the image-side surface 442 of the fourth lens element 440 and an image plane 470, and the IR filter 450 is made of glass and has no influence on the focal length of the image capturing lens system; the image capturing lens system further comprises an image sensor 460 provided on the image plane 470.

The detailed optical data of the fourth embodiment is shown in TABLE 9, and the aspheric surface data is shown in TABLE 10, wherein the units of the radius of curvature, the thickness and the focal length are expressed in mm, and HFOV is half of the maximal field of view.

TABLE 9

(Embodiment 4)
f = 3.84 mm, Fno = 2.88, HFOV = 36.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.238950 | (ASP) | 0.479 | Plastic | 1.544 | 55.9 | 2.05 |
| 2 | | −9.688600 | (ASP) | −0.021 | | | | |
| 3 | Ape. Stop | Plano | | 0.078 | | | | |
| 4 | Lens 2 | −3.872500 | (ASP) | 0.250 | Plastic | 1.634 | 23.8 | −4.01 |
| 5 | | 7.579000 | (ASP) | 0.536 | | | | |
| 6 | Lens 3 | −1.054470 | (ASP) | 0.509 | Plastic | 1.544 | 55.9 | 6.49 |
| 7 | | −0.950290 | (ASP) | 0.782 | | | | |
| 8 | Lens 4 | −50.000000 | (ASP) | 0.374 | Plastic | 1.535 | 56.3 | −4.57 |
| 9 | | 2.577400 | (ASP) | 0.600 | | | | |
| 10 | IR-filter | Plano | | 0.200 | Glass | 1.516 | 64.1 | — |
| 11 | | Plano | | 0.460 | | | | |
| 12 | Image | Plano | | — | | | | |

\* Reference wavelength is 587.6 nm (d-line)

TABLE 10

Aspheric Coefficients

| Surface # | | | | | | | | |
|---|---|---|---|---|---|---|---|---|
| | 1 | 2 | 4 | 5 | 6 | 7 | 8 | 9 |
| k = | −5.22185E+00 | −1.00000E+01 | 0.00000E+00 | 1.00000E+00 | −4.40695E−01 | −8.30510E−01 | 1.00000E+00 | −9.79463E−01 |
| A4 = | 3.04078E−01 | −1.13692E−02 | 3.02758E−01 | 3.65117E−01 | −1.38098E−01 | −4.29841E−02 | −1.30233E−01 | −1.83464E−01 |
| A6 = | −2.53280E−01 | 1.07236E−01 | −4.89684E−02 | −9.57408E−02 | −1.13477E−01 | 8.18889E−02 | 3.73390E−02 | 7.78717E−02 |
| A8 = | −1.31092E−01 | −9.91939E−01 | 1.64227E−01 | 6.22120E−01 | 6.38811E−01 | −3.62666E−01 | 8.73228E−03 | −2.78686E−02 |
| A10 = | 4.93693E−01 | 2.24439E+00 | −1.91037E+00 | −1.06102E+00 | −1.13162E+00 | 6.89142E−01 | −6.17654E−03 | 6.66107E−03 |
| A12 = | −9.09364E−01 | −3.84468E+00 | 5.33977E+00 | 1.87668E+00 | 2.66762E+00 | −2.35030E−01 | 1.14837E−03 | −8.69224E−04 |
| A14 = | 3.93711E−02 | 2.83324E+00 | −4.35730E+00 | −8.58452E−01 | −1.84926E+00 | −6.14585E−02 | −7.50108E−05 | 4.60516E−05 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11.

TABLE 11

(Embodiment 4)

| f | 3.84 | Ds/D12 | 0.58 |
|---|---|---|---|
| FNO | 2.88 | T34/CT3 | 1.54 |
| HFOV | 36.1 | T34/CT4 | 2.09 |
| V1 − V2 | 32.1 | CT1/CT2 | 1.92 |
| \|f/f3\| | 0.59 | R8/R7 | −0.05 |
| R2/f | −2.53 | TTL/ImgH | 1.46 |
| f/R3 | −0.99 | | |

Embodiment 5

Figure 5A:
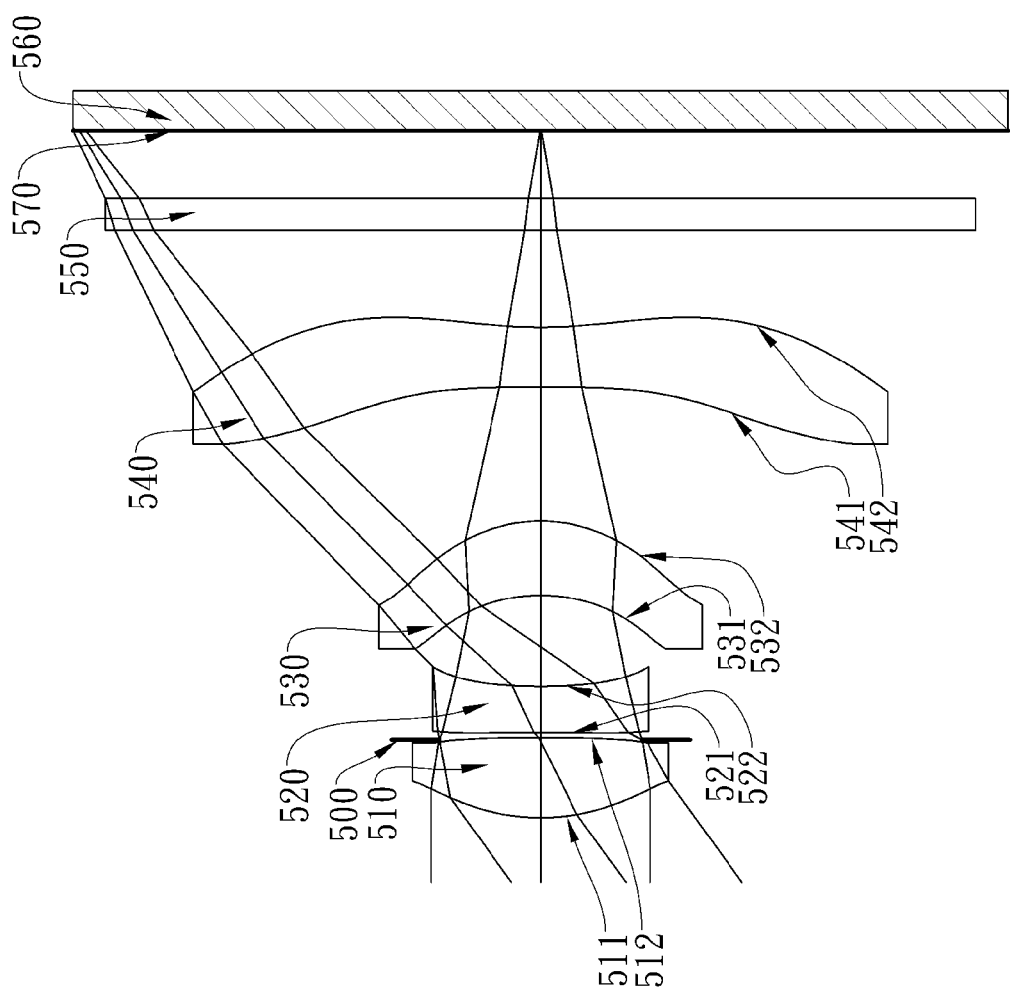
FIG. 5A shows an image capturing lens system in accordance with a fifth embodiment of the present invention.
Figure 5B:
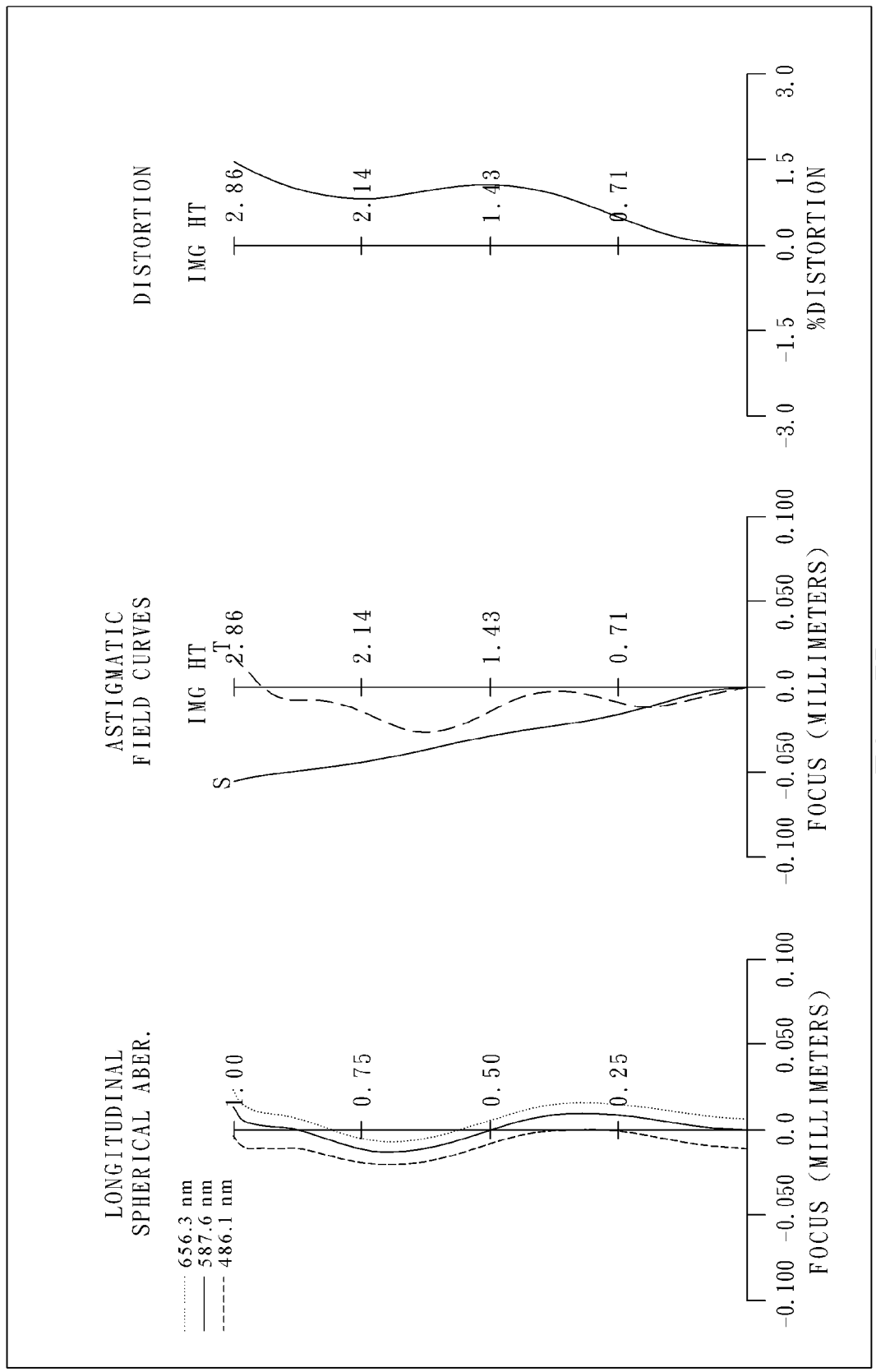
FIG. 5B shows the aberration curves of the fifth embodiment of the present invention.

FIG. 5A shows an image capturing lens system in accordance with the fifth embodiment of the present invention, and FIG. 5B shows the aberration curves of the fifth embodiment of the present invention. The image capturing lens system of the fifth embodiment of the present invention mainly comprises four non-cemented lens elements, in order from an object side to an image side:

a first lens element 510 made of plastic with positive refractive power having a convex object-side surface 511 and a convex image-side surface 512, the object-side and image-side surfaces 511 and 512 thereof being aspheric;

a second lens element 520 made of plastic with negative refractive power having a concave object-side surface 521 and a concave image-side surface 522, the object-side and image-side surfaces 521 and 522 thereof being aspheric;

a third lens element 530 made of plastic with positive refractive power having a concave object-side surface 531 and a convex image-side surface 532, the object-side and image-side surfaces 531 and 532 thereof being aspheric; and a fourth lens element 540 made of plastic with negative refractive power having a concave object-side surface 541 and a concave image-side surface 542, the object-side and image-side surfaces 541 and 542 thereof being aspheric, and at least one inflection point is formed on both the object-side surface 541 and the image-side surface 542 thereof;

wherein an aperture stop 500 is disposed between the first lens element 510 and the second lens element 520;

the image capturing lens system further comprises an IR filter 550 disposed between the image-side surface 542 of the fourth lens element 540 and an image plane 570, and the IR filter 550 is made of glass and has no influence on the focal length of the image capturing lens system; the image capturing lens system further comprises an image sensor 560 provided on the image plane 570.

The detailed optical data of the fifth embodiment is shown in TABLE 12, and the aspheric surface data is shown in TABLE 13, wherein the units of the radius of curvature, the thickness and the focal length are expressed in mm, and HFOV is half of the maximal field of view.

TABLE 12

(Embodiment 5)
f = 3.90 mm, Fno = 2.88, HFOV = 35.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.276430 | (ASP) | 0.497 | Plastic | 1.544 | 55.9 | 2.20 |
| 2 | | −16.515700 | (ASP) | −0.013 | | | | |
| 3 | Ape. Stop | Plano | | 0.044 | | | | |
| 4 | Lens 2 | −17.610000 | (ASP) | 0.284 | Plastic | 1.634 | 23.8 | −4.17 |
| 5 | | 3.127500 | (ASP) | 0.565 | | | | |
| 6 | Lens 3 | −1.083340 | (ASP) | 0.459 | Plastic | 1.544 | 55.9 | 6.26 |
| 7 | | −0.944710 | (ASP) | 0.830 | | | | |
| 8 | Lens 4 | −25.160400 | (ASP) | 0.371 | Plastic | 1.535 | 56.3 | −4.68 |
| 9 | | 2.789290 | (ASP) | 0.600 | | | | |
| 10 | IR-filter | Plano | | 0.200 | Glass | 1.516 | 64.1 | — |
| 11 | | Plano | | 0.415 | | | | |
| 12 | Image | Plano | | — | | | | |

* Reference wavelength is 587.6 nm (d-line)

TABLE 13

Aspheric Coefficients

| | Surface # | | | | | | | |
|---|---|---|---|---|---|---|---|---|
| | 1 | 2 | 4 | 5 | 6 | 7 | 8 | 9 |
| k = | −5.97513E+00 | 1.00000E+00 | 0.00000E+00 | −9.94470E+00 | −7.67731E−01 | −6.81939E−01 | 1.00000E+00 | −3.75124E−01 |
| A4 = | 3.20444E−01 | −1.28730E−01 | 8.79167E−03 | 2.06739E−01 | −1.94611E−01 | −5.12579E−02 | −1.21926E−01 | −1.75945E−01 |
| A6 = | −3.03459E−01 | 2.71816E−01 | 3.65977E−01 | 1.21740E−01 | −1.55047E−01 | 9.86701E−02 | 3.83360E−02 | 7.38064E−02 |
| A8 = | −6.83764E−02 | −7.38348E−01 | −1.14796E−01 | 2.60298E−01 | −4.05759E−01 | −4.61014E−01 | 7.03854E−03 | −2.66234E−02 |
| A10 = | 6.38973E−01 | 1.58585E+00 | −1.70676E+00 | −6.33331E−01 | 2.23648E+00 | 6.62726E−01 | −6.10138E−03 | 6.48922E−03 |
| A12 = | −1.33774E+00 | −3.31141E+00 | 5.08156E+00 | 1.61095E+00 | −1.76246E+00 | −2.24901E−02 | 1.23671E−03 | −8.98422E−04 |
| A14 = | 6.44353E−01 | 2.83339E+00 | −4.36121E+00 | −8.58900E−01 | 7.12092E−01 | −8.75307E−02 | −8.54871E−05 | 5.25004E−05 |
| A16 = | −3.98970E−02 | −3.93323E−03 | −7.54490E−09 | 1.89697E−08 | −1.02756E−03 | −7.14675E−02 | | |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14.

TABLE 14

(Embodiment 5)

| | | | |
|---|---|---|---|
| f | 3.90 | Ds/D12 | 0.60 |
| FNO | 2.88 | T34/CT3 | 1.81 |
| HFOV | 35.9 | T34/CT4 | 2.24 |
| V1 − V2 | 32.1 | CT1/CT2 | 1.75 |
| \|f/f3\| | 0.62 | R8/R7 | −0.11 |
| R2/f | −4.24 | TTL/ImgH | 1.47 |
| f/R3 | −0.22 | | |

Embodiment 6

Figure 6A:
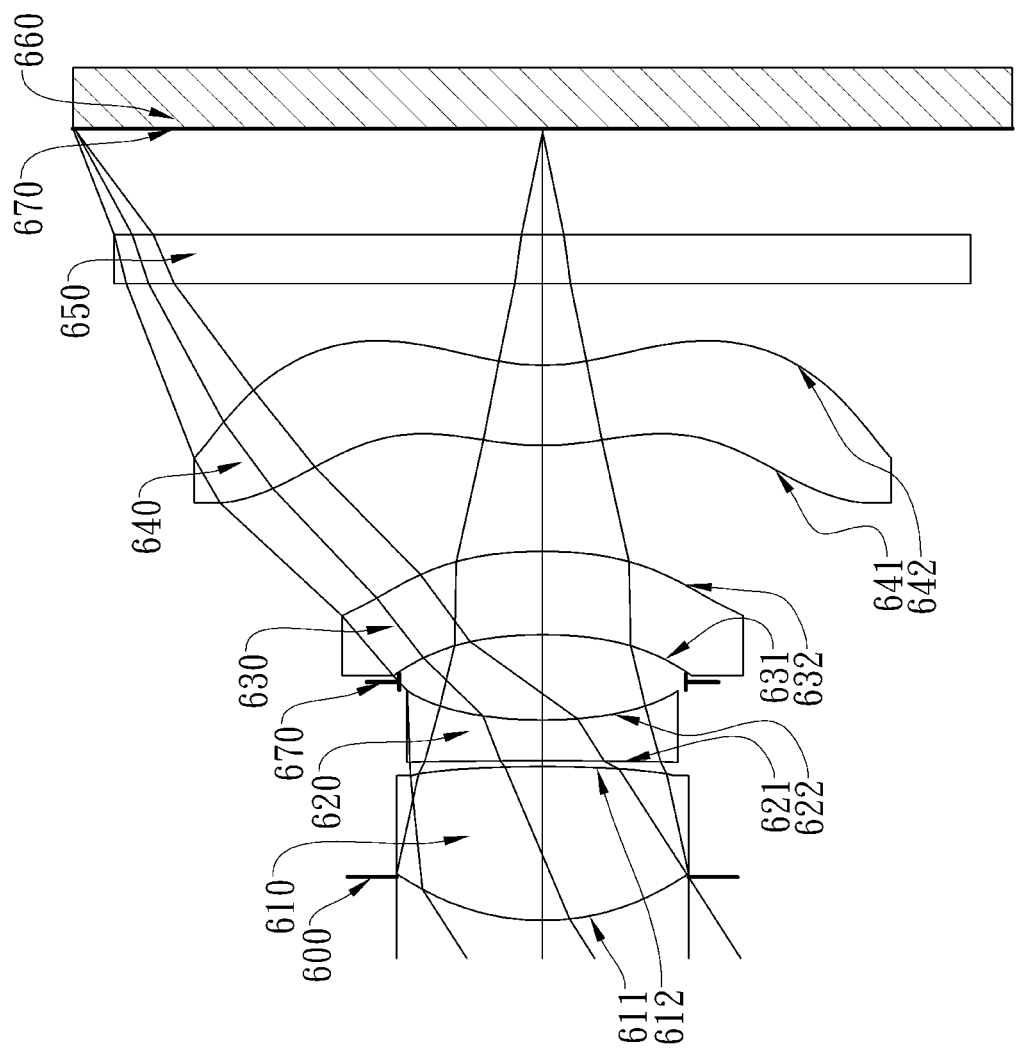
FIG. 6A shows an image capturing lens system in accordance with a sixth embodiment of the present invention.
Figure 6B:
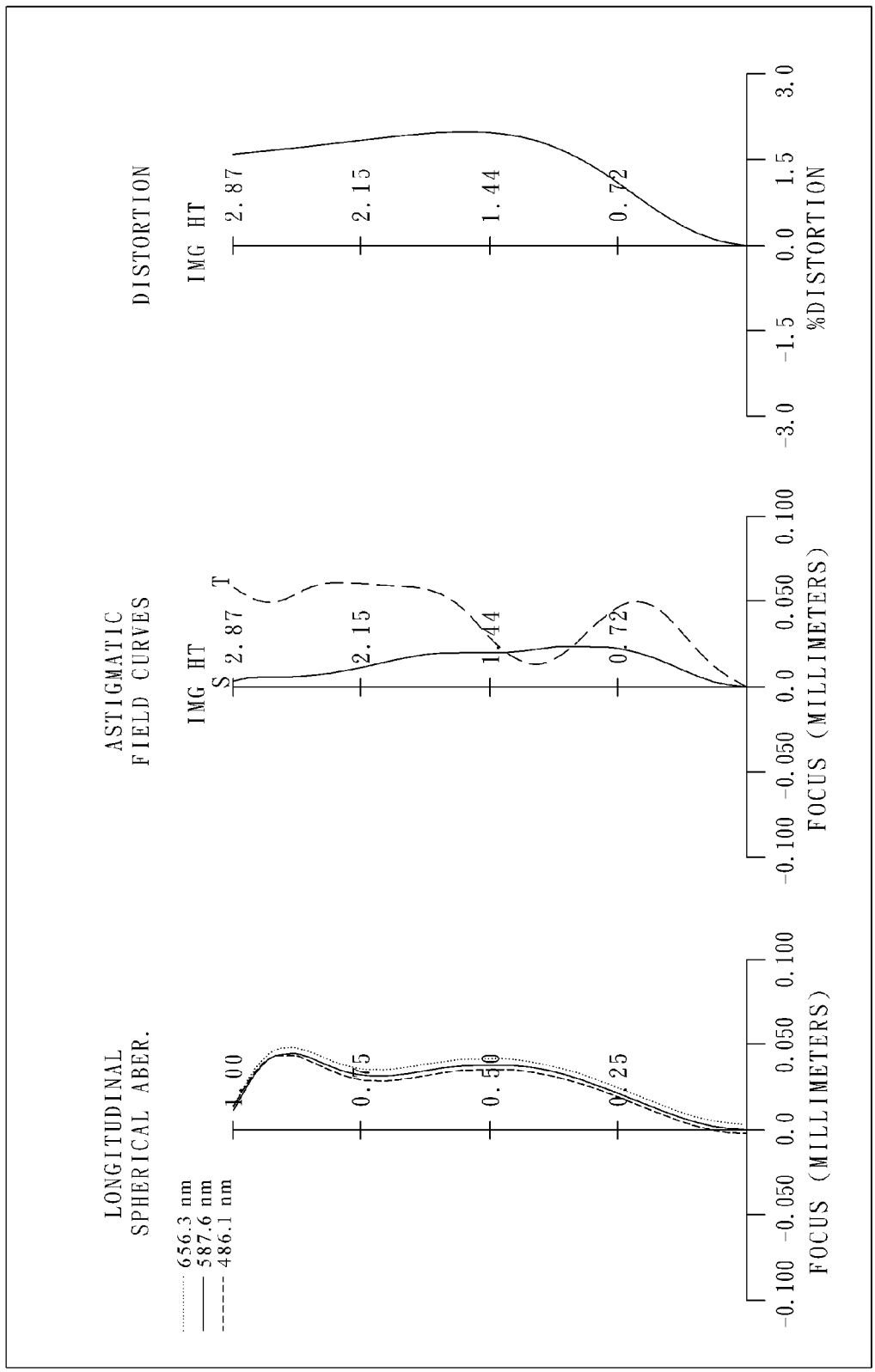
FIG. 6B shows the aberration curves of the sixth embodiment of the present invention.

FIG. 6A shows an image capturing lens system in accordance with the sixth embodiment of the present invention, and FIG. 6B shows the aberration curves of the sixth embodiment of the present invention. The image capturing lens system of the sixth embodiment of the present invention mainly comprises four non-cemented lens elements, in order from an object side to an image side:

a first lens element 610 made of plastic with positive refractive power having a convex object-side surface 611 and a convex image-side surface 612, the object-side and image-side surfaces 611 and 612 thereof being aspheric;

a second lens element 620 made of plastic with negative refractive power having a concave object-side surface 621 and a concave image-side surface 622, the object-side and image-side surfaces 621 and 622 thereof being aspheric;

a third lens element 630 made of plastic with positive refractive power having a concave object-side surface 631 and a convex image-side surface 632, the object-side and image-side surfaces 631 and 632 thereof being aspheric; and a fourth lens element 640 made of plastic with negative refractive power having a convex object-side surface 641 and a concave image-side surface 642, the object-side and image-side surfaces 641 and 642 thereof being aspheric, and at least one inflection point is formed on both the object-side surface 641 and the image-side surface 642 thereof;

wherein an aperture stop 600 is disposed between an imaged object and the first lens element 610; moreover, a stop 670 is disposed between the second lens element 620 and the third lens element 630;

the image capturing lens system further comprises an IR filter 650 disposed between the image-side surface 642 of the fourth lens element 640 and an image plane 670, and the IR filter 650 is made of glass and has no influence on the focal length of the image capturing lens system; the image capturing lens system further comprises an image sensor 660 provided on the image plane 670.

The detailed optical data of the sixth embodiment is shown in TABLE 15, and the aspheric surface data is shown in TABLE 16, wherein the units of the radius of curvature, the thickness and the focal length are expressed in mm, and HFOV is half of the maximal field of view.

TABLE 15

(Embodiment 6)
f = 4.39 mm, Fno = 2.45, HFOV = 32.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.267 | | | | |
| 2 | Lens 1 | 1.492840 | (ASP) | 0.945 | Plastic | 1.544 | 55.9 | 2.39 |
| 3 | | −7.848000 | (ASP) | 0.036 | | | | |
| 4 | Lens 2 | −19.554600 | (ASP) | 0.250 | Plastic | 1.634 | 23.8 | −3.73 |
| 5 | | 2.703590 | (ASP) | 0.234 | | | | |
| 6 | | Plano | | 0.290 | | | | |
| 7 | Lens 3 | −2.729070 | (ASP) | 0.512 | Plastic | 1.634 | 23.8 | 178.96 |
| 8 | | −2.858960 | (ASP) | 0.652 | | | | |
| 9 | Lens 4 | 1.665990 | (ASP) | 0.492 | Plastic | 1.544 | 55.9 | −23.94 |
| 10 | | 1.323340 | (ASP) | 0.500 | | | | |
| 11 | IR-filter | Plano | | 0.300 | Glass | 1.516 | 64.1 | — |
| 12 | | Plano | | 0.653 | | | | |
| 13 | Image | Plano | | — | | | | |

* Reference wavelength is 587.6 nm (d-line)
half of an effective radius of the stop at surface 6 is 0.88 mm

TABLE 16

Aspheric Coefficients

| | Surface # | | | | | | |
|---|---|---|---|---|---|---|---|
| 2 | 3 | 4 | 5 | 7 | 8 | 9 | 10 |
| k = −7.99511E−01 | 1.64966E+01 | 9.90000E+01 | −2.22211E+01 | 5.40844E+00 | −3.28983E+01 | −6.43670E+00 | −4.56232E+00 |
| A4 = 1.62192E−02 | 1.59855E−02 | 3.96919E−02 | 1.87692E−01 | −1.71124E−01 | −3.71680E−01 | −2.50431E−01 | −1.79316E−01 |
| A6 = 6.42237E−02 | −2.37619E−02 | 4.74766E−03 | −5.28384E−02 | 3.63219E−01 | 4.04690E−01 | 7.46975E−02 | 7.36183E−02 |
| A8 = −2.42847E−01 | −8.04520E−02 | −7.69725E−02 | −1.13127E−01 | −1.13086E+00 | −3.55816E−01 | −7.22014E−03 | −2.38154E−02 |
| A10 = 6.06730E−01 | 2.87713E−01 | 4.44193E−01 | 8.49552E−01 | 2.20727E+00 | 1.51518E−01 | 2.16555E−04 | 4.22522E−03 |
| A12 = −9.48100E−01 | −9.43926E−01 | −1.54938E+00 | −1.63419E+00 | −2.34596E+00 | 4.66882E−02 | −1.03981E−05 | −9.61302E−05 |
| A14 = 7.80038E−01 | 1.14564E+00 | 1.92714E+00 | 1.37236E+00 | 1.42150E+00 | −5.00681E−02 | −1.80065E−05 | −9.88147E−05 |
| A16 = −2.63751E−01 | −4.57426E−01 | −7.84276E−01 | −3.30834E−01 | −4.06369E−01 | 7.70892E−03 | 3.54094E−06 | 1.20098E−05 |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17.

TABLE 17

(Embodiment 6)

| | | | |
|---|---|---|---|
| f | 4.39 | Ds/D12 | 0.22 |
| FNO | 2.45 | T34/CT3 | 1.27 |
| HFOV | 32.6 | T34/CT4 | 1.33 |
| V1 − V2 | 32.1 | CT1/CT2 | 3.78 |
| \|f/f3\| | 0.03 | R8/R7 | 0.79 |
| R2/f | −1.79 | TTL/ImgH | 1.66 |
| f/R3 | −0.22 | | |

Embodiment 7

Figure 7A:
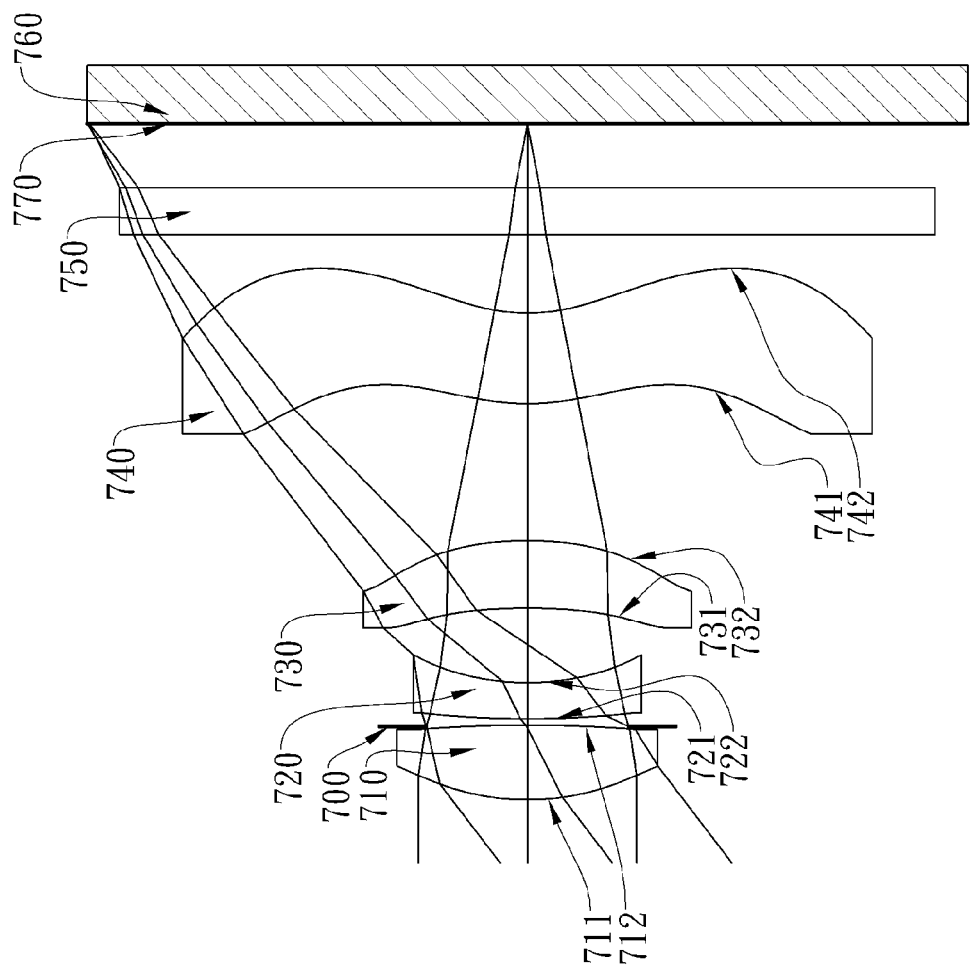
FIG. 7A shows an image capturing lens system in accordance with a seventh embodiment of the present invention.
Figure 7B:
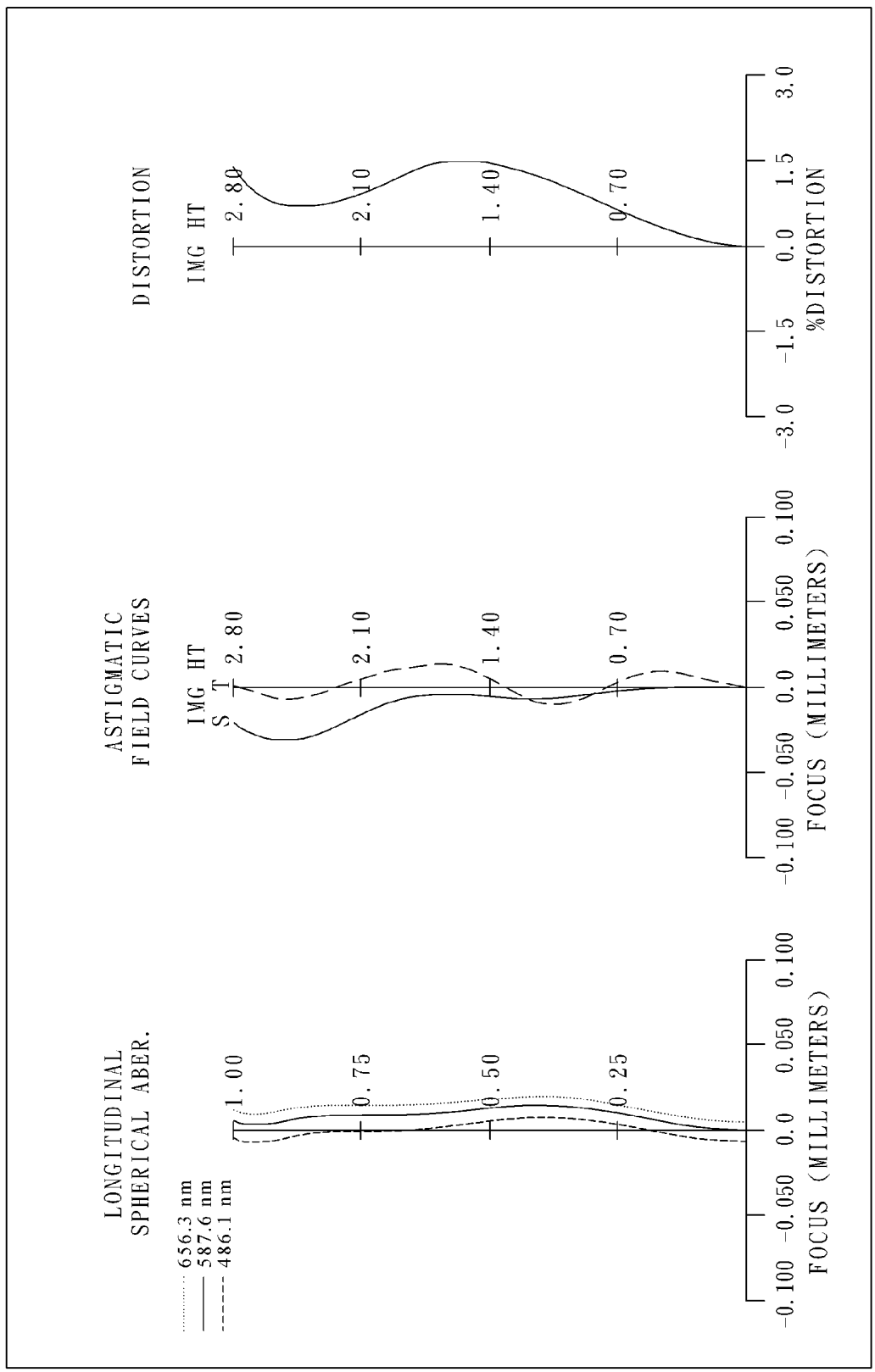
FIG. 7B shows the aberration curves of the seventh embodiment of the present invention.

FIG. 7A shows an image capturing lens system in accordance with the seventh embodiment of the present invention, and FIG. 7B shows the aberration curves of the seventh embodiment of the present invention. The image capturing lens system of the seventh embodiment of the present invention mainly comprises four non-cemented lens elements, in order from an object side to an image side:

a first lens element 710 made of plastic with positive refractive power having a convex object-side surface 711 and a convex image-side surface 712, the object-side and image-side surfaces 711 and 712 thereof being aspheric;

a second lens element 720 made of plastic with negative refractive power having a convex object-side surface 721 and a concave image-side surface 722, the object-side and image-side surfaces 721 and 722 thereof being aspheric;

a third lens element 730 made of plastic with positive refractive power having a concave object-side surface 731 and a convex image-side surface 732, the object-side and image-side surfaces 731 and 732 thereof being aspheric; and a fourth lens element 740 made of plastic with negative refractive power having a convex object-side surface 741 and a concave image-side surface 742, the object-side and image-side surfaces 741 and 742 thereof being aspheric, and at least one inflection point is formed on both the object-side surface 741 and the image-side surface 742 thereof;

wherein an aperture stop 700 is disposed between the first lens element 710 and the second lens element 720;

the image capturing lens system further comprises an IR filter 750 disposed between the image-side surface 742 of the fourth lens element 740 and an image plane 770, and the IR filter 750 is made of glass and has no influence on the focal length of the image capturing lens system; the image capturing lens system further comprises an image sensor 760 provided on the image plane 770.

The detailed optical data of the seventh embodiment is shown in TABLE 18, and the aspheric surface data is shown in TABLE 19, wherein the units of the radius of curvature, the thickness and the focal length are expressed in mm, and HFOV is half of the maximal field of view.

TABLE 18

(Embodiment 7)
f = 3.61 mm, Fno = 2.60, HFOV = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.564670 (ASP) | 0.475 | Plastic | 1.544 | 55.9 | 2.44 |
| 2 | | −7.849700 (ASP) | −0.008 | | | | |
| 3 | Ape. Stop | Plano | 0.048 | | | | |
| 4 | Lens 2 | 5.482900 (ASP) | 0.230 | Plastic | 1.607 | 26.6 | −3.55 |
| 5 | | 1.524160 (ASP) | 0.475 | | | | |
| 6 | Lens 3 | −4.351200 (ASP) | 0.431 | Plastic | 1.544 | 55.9 | 8.77 |
| 7 | | −2.356050 (ASP) | 0.872 | | | | |
| 8 | Lens 4 | 1.426660 (ASP) | 0.577 | Plastic | 1.514 | 56.8 | −18.12 |
| 9 | | 1.067260 (ASP) | 0.500 | | | | |
| 10 | IR-filter | Plano | 0.300 | Glass | 1.516 | 64.1 | — |
| 11 | | Plano | 0.406 | | | | |
| 12 | Image | Plano | — | | | | |

* Reference wavelength is 587.6 nm (d-line)

TABLE 19

Aspheric Coefficients

| | Surface # | | | | | | | |
|---|---|---|---|---|---|---|---|---|
| | 1 | 2 | 4 | 5 | 6 | 7 | 8 | 9 |
| k = | −7.61636E+00 | −7.51616E+00 | 0.00000E+00 | −9.20285E+00 | 1.00000E+00 | −1.45757E+01 | −5.40490E+00 | −3.02439E+00 |
| A4 = | 2.25736E−01 | 1.07281E−02 | −1.07227E−01 | 1.86209E−01 | −1.92074E−01 | −3.73420E−01 | −1.60150E−01 | −1.52048E−01 |
| A6 = | −1.93447E−01 | 1.59698E−01 | 4.64197E−01 | −3.61922E−02 | 2.27606E−01 | 4.25974E−01 | 1.87696E−02 | 7.08309E−02 |
| A8 = | −7.27522E−04 | −6.53210E−01 | −5.90301E−01 | 2.19467E−01 | −3.97842E−01 | −5.26688E−01 | 1.17780E−02 | −2.67867E−02 |
| A10 = | 2.37045E−01 | 1.42899E+00 | −1.39438E+00 | −7.99849E−01 | 5.92168E−01 | 4.44473E−01 | −5.70839E−03 | 6.31553E−03 |
| A12 = | −1.92061E−01 | −3.14347E+00 | 6.10029E+00 | 1.55346E+00 | −2.99655E−01 | −2.09639E−01 | 1.15382E−03 | −8.40328E−04 |
| A14 = | −2.00569E−01 | 4.18272E+00 | −8.76474E+00 | −1.28178E+00 | 2.39116E−01 | 1.23721E−01 | −8.96651E−05 | 4.80380E−05 |
| A16 = | 1.22331E−01 | −2.25248E+00 | 4.63664E+00 | 1.73494E−01 | −1.68061E−01 | −4.30997E−02 | | |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20.

TABLE 20

(Embodiment 7)

| | | | |
|---|---|---|---|
| f | 3.61 | Ds/D12 | 0.63 |
| FNO | 2.60 | T34/CT3 | 2.02 |
| HFOV | 37.4 | T34/CT4 | 1.51 |
| V1 − V2 | 29.3 | CT1/CT2 | 2.07 |
| |f/f3| | 0.41 | R8/R7 | 0.75 |
| R2/f | −2.18 | TTL/ImgH | 1.50 |
| f/R3 | 0.66 | | |

Embodiment 8

Figure 8A:
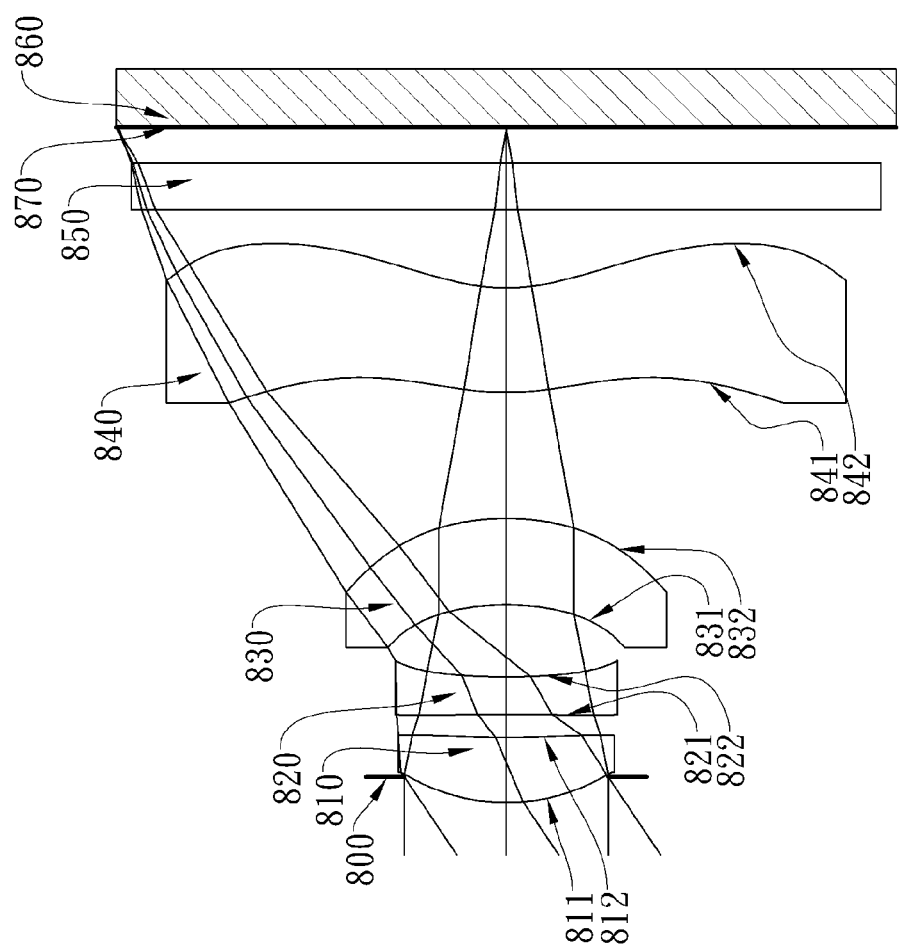
FIG. 8A shows an image capturing lens system in accordance with an eighth embodiment of the present invention.
Figure 8B:
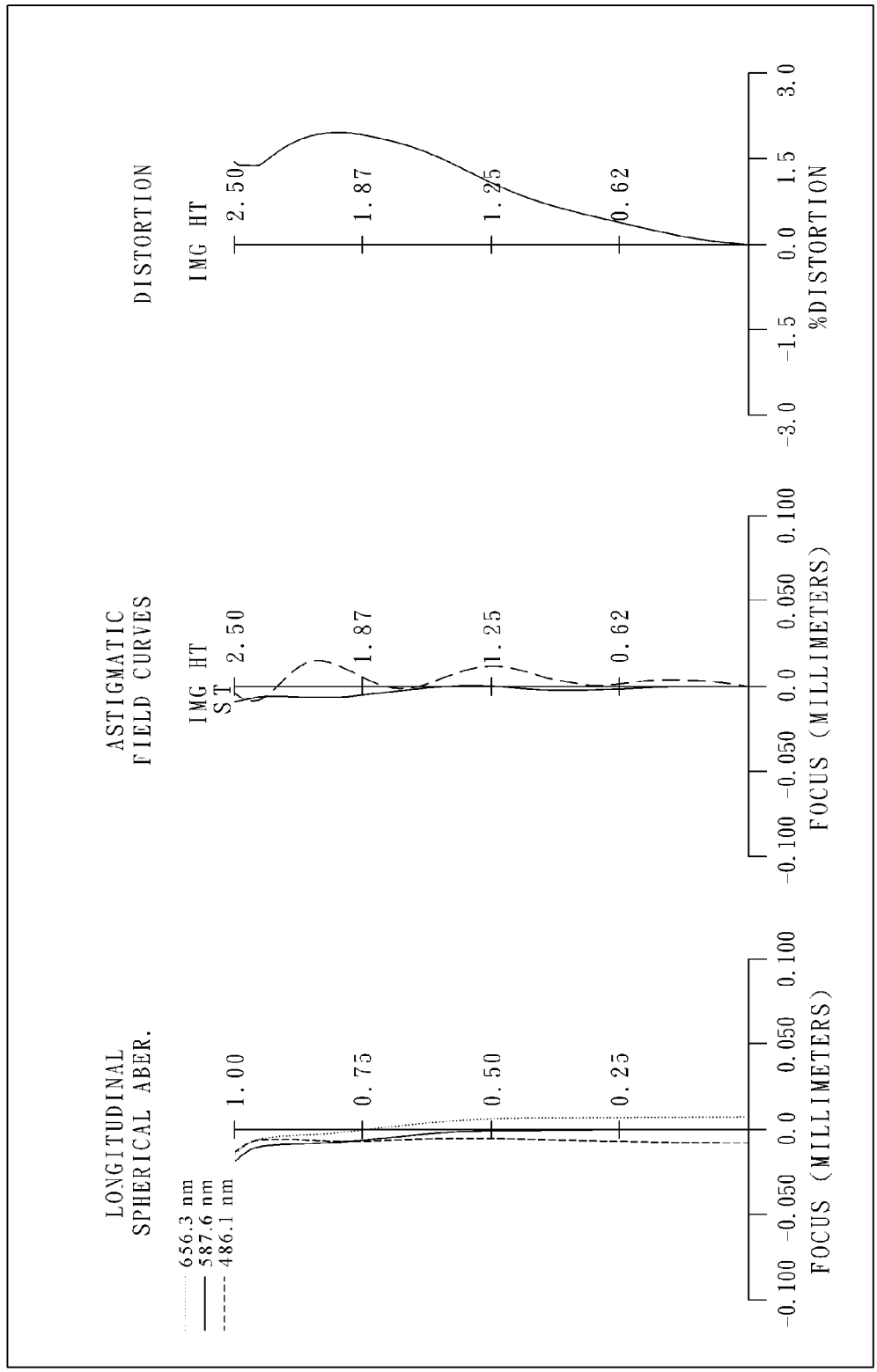
FIG. 8B shows the aberration curves of the eighth embodiment of the present invention.

FIG. 8A shows an image capturing lens system in accordance with the eighth embodiment of the present invention, and FIG. 8B shows the aberration curves of the eighth embodiment of the present invention. The image capturing lens system of the eighth embodiment of the present invention mainly comprises four non-cemented lens elements, in order from an object side to an image side:

a first lens element 810 made of glass with positive refractive power having a convex object-side surface 811 and a concave image-side surface 812, the object-side and image-side surfaces 811 and 812 thereof being aspheric;

a second lens element 820 made of plastic with negative refractive power having a concave object-side surface 821 and a concave image-side surface 822, the object-side and image-side surfaces 821 and 822 thereof being aspheric;

a third lens element 830 made of plastic with positive refractive power having a concave object-side surface 831 and a convex image-side surface 832, the object-side and image-side surfaces 831 and 832 thereof being aspheric; and a fourth lens element 840 made of plastic with negative refractive power having a convex object-side surface 841 and a concave image-side surface 842, the object-side and image-side surfaces 841 and 842 thereof being aspheric, and at least one inflection point is formed on both the object-side surface 841 and the image-side surface 842 thereof;

wherein an aperture stop 800 is disposed between an imaged object the first lens element 810;

the image capturing lens system further comprises an IR filter 850 disposed between the image-side surface 842 of the fourth lens element 840 and an image plane 870, and the IR filter 850 is made of glass and has no influence on the focal length of the image capturing lens system; the image capturing lens system further comprises an image sensor 860 provided on the image plane 870.

The detailed optical data of the eighth embodiment is shown in TABLE 21, and the aspheric surface data is shown in TABLE 22, wherein the units of the radius of curvature, the thickness and the focal length are expressed in mm, and HFOV is half of the maximal field of view.

TABLE 21

(Embodiment 8)
f = 3.66 mm, Fno = 2.80, HFOV = 34.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.163 | | | | |
| 2 | Lens 1 | 1.261570 | (ASP) | 0.417 | Glass | 1.566 | 61.1 | 2.64 |
| 3 | | 7.124900 | (ASP) | 0.146 | | | | |
| 4 | Lens 2 | −81.300800 | (ASP) | 0.242 | Plastic | 1.650 | 21.4 | −6.32 |
| 5 | | 4.332900 | (ASP) | 0.462 | | | | |
| 6 | Lens 3 | −1.809990 | (ASP) | 0.554 | Plastic | 1.544 | 55.9 | 21.80 |
| 7 | | −1.739790 | (ASP) | 0.809 | | | | |
| 8 | Lens 4 | 1.762250 | (ASP) | 0.670 | Plastic | 1.535 | 56.3 | −12.46 |
| 9 | | 1.208980 | (ASP) | 0.500 | | | | |
| 10 | IR-filter | Plano | | 0.300 | Glass | 1.516 | 64.1 | — |
| 11 | | Plano | | 0.230 | | | | |
| 12 | Image | Plano | | — | | | | |

* Reference wavelength is 587.6 nm (d-line)

TABLE 22

Aspheric Coefficients

| | Surface # | | | | | | | |
|---|---|---|---|---|---|---|---|---|
| | 2 | 3 | 4 | 5 | 6 | 7 | 8 | 9 |
| k = | −4.55907E+00 | −1.00000E+00 | −1.00000E+00 | −1.00000E+01 | −3.36938E−01 | −3.80114E−01 | −8.60869E+00 | −3.78246E+00 |
| A4 = | 2.89161E−01 | −6.85562E−02 | −4.01524E−02 | 8.38326E−02 | −2.58709E−01 | −2.27432E−01 | −1.41133E−01 | −1.25182E−01 |
| A6 = | −1.82554E−01 | 4.01202E−02 | 5.91822E−02 | 1.46912E−01 | 4.91620E−02 | 2.82613E−01 | 3.51392E−02 | 6.54399E−02 |
| A8 = | 5.86643E−03 | −4.02202E−01 | 6.81259E−01 | −3.77038E−02 | −3.11022E−01 | −5.23115E−01 | 7.34396E−03 | −2.55046E−02 |
| A10 = | 4.69049E−01 | 1.43853E+00 | −3.39246E+00 | 1.42766E−01 | 1.10153E−01 | 5.84786E−01 | −6.15495E−03 | 6.33210E−03 |
| A12 = | −2.55303E−01 | −2.68521E+00 | 8.84128E+00 | −5.45341E+00 | −2.16266E−01 | −3.05350E−01 | 1.23228E−03 | −9.02223E−04 |
| A14 = | −2.07177E+00 | 4.05563E−02 | −1.33944E+01 | 8.53601E+00 | 8.83750E−01 | 9.13509E−04 | −7.66144E−05 | 5.40134E−05 |
| A16 = | 2.28039E+00 | 2.52437E+00 | 9.10300E+00 | −3.94755E+00 | −1.51003E+00 | 4.85489E−02 | | |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23.

TABLE 23

(Embodiment 8)

| | | | |
|---|---|---|---|
| f | 3.66 | Ds/D12 | 0.20 |
| FNO | 2.80 | T34/CT3 | 1.46 |
| HFOV | 34.0 | T34/CT4 | 1.21 |
| V1 − V2 | 39.7 | CT1/CT2 | 1.72 |
| \|f/f3\| | 0.17 | R8/R7 | 0.69 |
| R2/f | 1.95 | TTL/ImgH | 1.69 |
| f/R3 | −0.04 | | |

Embodiment 9

Figure 9A:
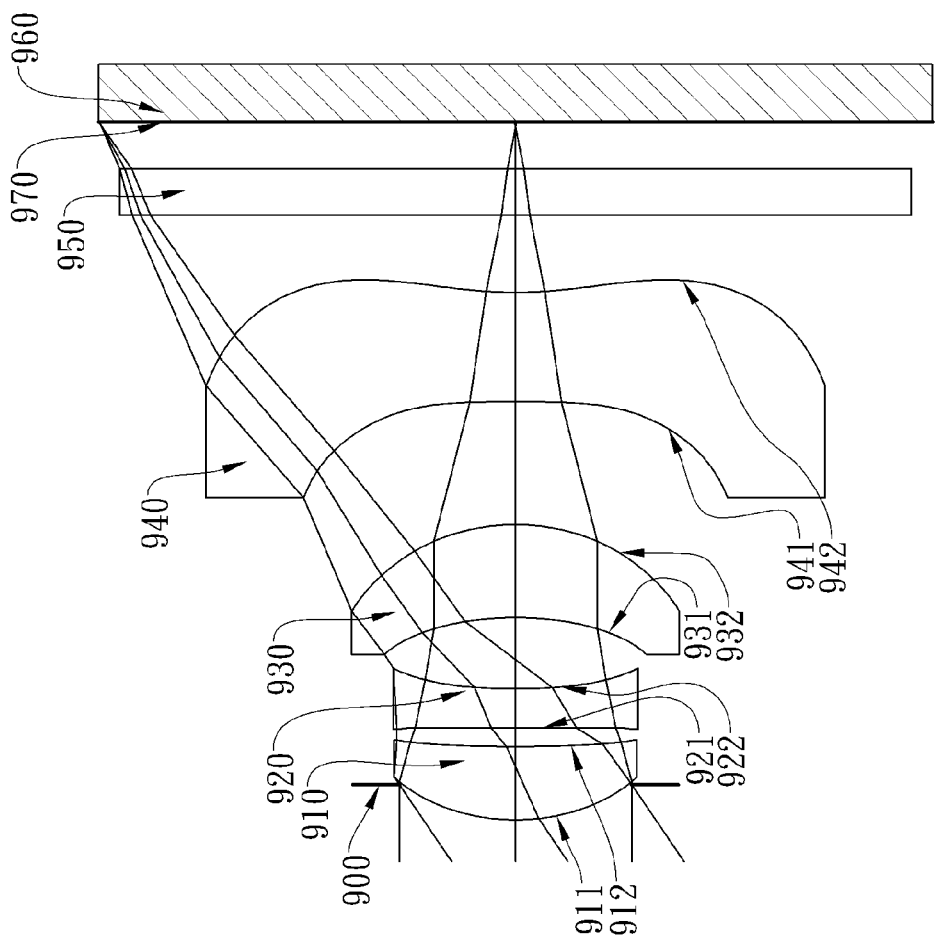
FIG. 9A shows an image capturing lens system in accordance with a ninth embodiment of the present invention.
Figure 9B:
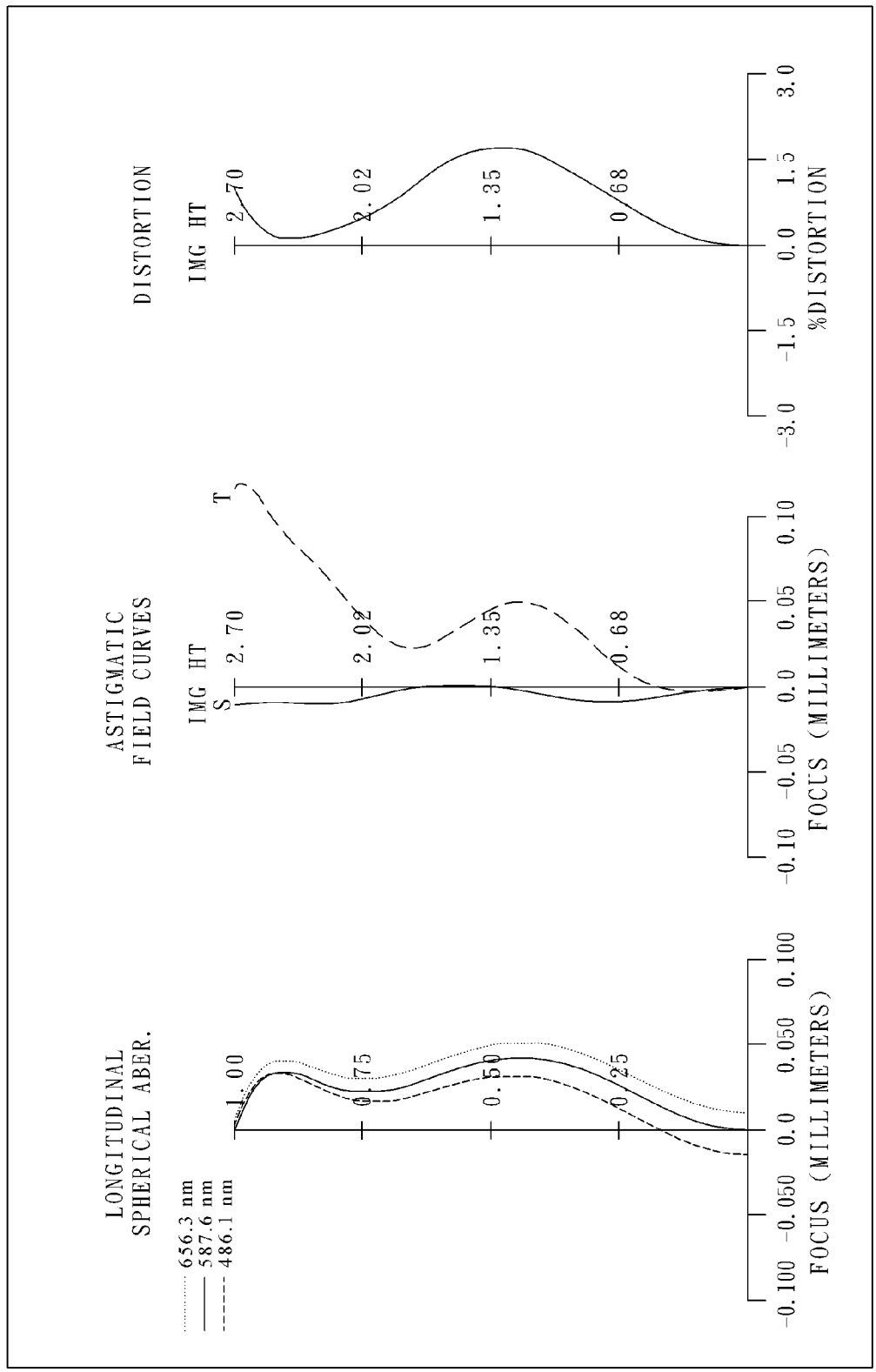
FIG. 9B shows the aberration curves of the ninth embodiment of the present invention.

FIG. 9A shows an image capturing lens system in accordance with the ninth embodiment of the present invention, and FIG. 9B shows the aberration curves of the ninth embodiment of the present invention. The image capturing lens system of the ninth embodiment of the present invention mainly comprises four non-cemented lens elements, in order from an object side to an image side:

a first lens element 910 made of plastic with positive refractive power having a convex object-side surface 911 and a concave image-side surface 912, the object-side and image-side surfaces 911 and 912 thereof being aspheric;

a second lens element 920 made of plastic with negative refractive power having a convex object-side surface 921 and a concave image-side surface 922, the object-side and image-side surfaces 921 and 922 thereof being aspheric;

a third lens element 930 made of plastic with positive refractive power having a concave object-side surface 931 and a convex image-side surface 932, the object-side and image-side surfaces 931 and 932 thereof being aspheric; and a fourth lens element 940 made of plastic with negative refractive power having a concave object-side surface 941 and a concave image-side surface 942, the object-side and image-side surfaces 941 and 942 thereof being aspheric, and at least one inflection point is formed on the image-side surface 942 thereof;

wherein an aperture stop 900 is disposed between an imaged object and the first lens element 910;

the image capturing lens system further comprises an IR filter 950 disposed between the image-side surface 942 of the fourth lens element 940 and an image plane 970, and the IR filter 950 is made of glass and has no influence on the focal length of the image capturing lens system; the image capturing lens system further comprises an image sensor 960 provided on the image plane 970.

The detailed optical data of the ninth embodiment is shown in TABLE 24, and the aspheric surface data is shown in TABLE 25, wherein the units of the radius of curvature, the thickness and the focal length are expressed in mm, and HFOV is half of the maximal field of view.

TABLE 24

(Embodiment 9)
f = 3.92 mm, Fno = 2.60, HFOV = 34.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.229 | | | | |
| 2 | Lens 1 | 1.334780 | (ASP) | 0.475 | Plastic | 1.544 | 55.9 | 2.84 |
| 3 | | 8.527200 | (ASP) | 0.120 | | | | |
| 4 | Lens 2 | 42.680300 | (ASP) | 0.255 | Plastic | 1.650 | 21.4 | −6.26 |
| 5 | | 3.702800 | (ASP) | 0.461 | | | | |
| 6 | Lens 3 | −2.305520 | (ASP) | 0.603 | Plastic | 1.544 | 55.9 | 5.43 |
| 7 | | −1.414430 | (ASP) | 0.797 | | | | |
| 8 | Lens 4 | −22.988500 | (ASP) | 0.710 | Plastic | 1.544 | 55.9 | −4.18 |
| 9 | | 2.554530 | (ASP) | 0.500 | | | | |
| 10 | IR-filter | Plano | | 0.300 | Glass | 1.516 | 64.1 | — |
| 11 | | Plano | | 0.305 | | | | |
| 12 | Image | Plano | | — | | | | |

* Reference wavelength is 587.6 nm (d-line)

TABLE 25

Aspheric Coefficients

| | Surface # | | | | | | | |
|---|---|---|---|---|---|---|---|---|
| | 2 | 3 | 4 | 5 | 6 | 7 | 8 | 9 |
| k = | −5.66190E+00 | −1.00000E+00 | 0.00000E+00 | −5.17043E+00 | −2.79014E+00 | −1.38120E+00 | 9.60408E−01 | −6.60496E−01 |
| A4 = | 2.99792E−01 | −3.07069E−02 | −7.04884E−02 | 7.41528E−02 | −1.60019E−01 | −1.43048E−01 | −1.95562E−01 | −1.53942E−01 |
| A6 = | −1.62817E−01 | 8.75504E−02 | 1.89658E−01 | 9.62061E−02 | 4.62180E−02 | 1.50033E−01 | 5.20356E−02 | 5.37565E−02 |
| A8 = | 1.38292E−02 | −2.49149E−01 | 2.87419E−01 | 2.46065E−01 | −1.43526E−01 | −4.35610E−01 | −2.63385E−02 | −2.13895E−02 |
| A10 = | 5.28288E−01 | 1.75943E+00 | −2.33998E+00 | −6.76126E−01 | 3.53564E−01 | 5.78055E−01 | 1.25973E−02 | 5.87288E−03 |
| A12 = | −3.80836E−01 | −3.84125E+00 | 4.63466E+00 | 9.30864E−01 | −4.62743E−01 | −3.13413E−01 | 2.54031E−03 | −8.94222E−04 |
| A14 = | −7.43751E−01 | 2.61469E+00 | −4.67893E+00 | −1.89636E+00 | 5.32154E−01 | 1.64137E−02 | −3.69422E−03 | 4.45568E−05 |
| A16 = | 1.05267E+00 | 2.40961E−01 | 1.72248E+00 | 1.80451E+00 | −5.96408E−01 | 1.52028E−02 | | |

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 26.

TABLE 26

(Embodiment 9)

| f | 3.92 | Ds/D12 | 0.27 |
|---|---|---|---|
| FNO | 2.60 | T34/CT3 | 1.32 |
| HFOV | 34.2 | T34/CT4 | 1.12 |
| V1 − V2 | 34.5 | CT1/CT2 | 1.86 |
| |f/f3| | 0.72 | R8/R7 | −0.11 |
| R2/f | 2.18 | TTL/ImgH | 1.64 |
| f/R3 | 0.09 | | |

Embodiment 10

Figure 10A:
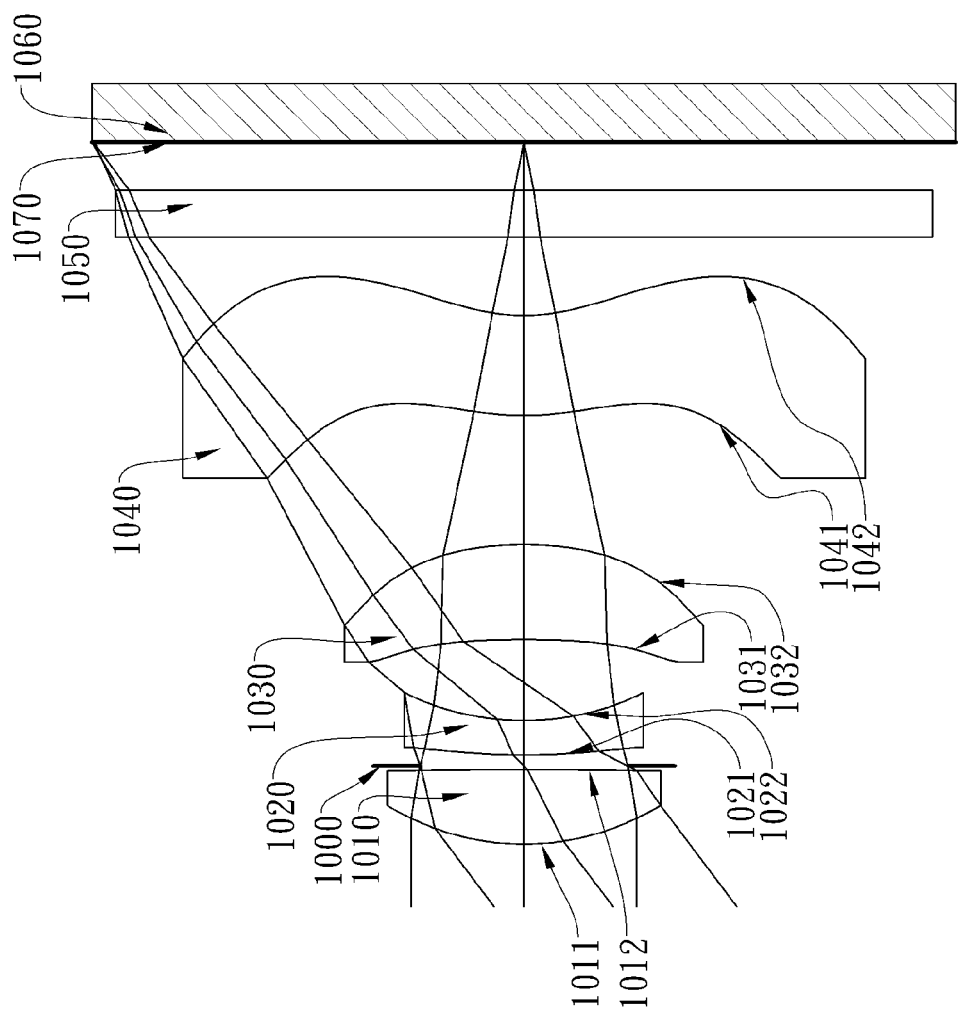
FIG. 10A shows an image capturing lens system in accordance with a tenth embodiment of the present invention.
Figure 10B:
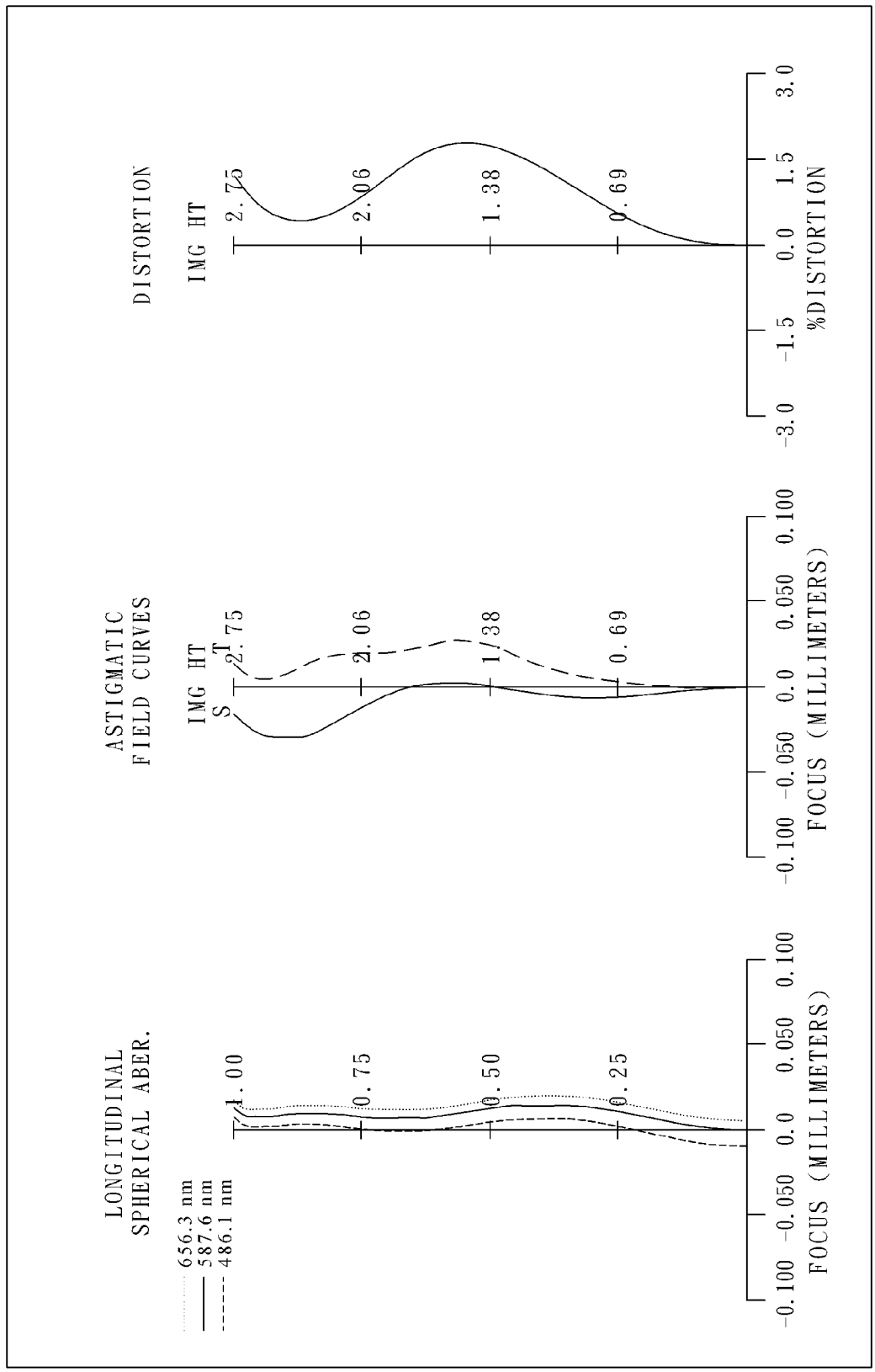
FIG. 10B shows the aberration curves of the tenth embodiment of the present invention.

FIG. 10A shows an image capturing lens system in accordance with the tenth embodiment of the present invention, and FIG. 10B shows the aberration curves of the tenth embodiment of the present invention. The image capturing lens system of the tenth embodiment of the present invention mainly comprises four non-cemented lens elements, in order from an object side to an image side:

a first lens element 1010 made of plastic with positive refractive power having a convex object-side surface 1011 and a convex image-side surface 1012, the object-side and image-side surfaces 1011 and 1012 thereof being aspheric;

a second lens element 1020 made of plastic with negative refractive power having a convex object-side surface 1021 and a concave image-side surface 1022, the object-side and image-side surfaces 1021 and 1022 thereof being aspheric;

a third lens element 1030 made of plastic with positive refractive power having a concave object-side surface 1031 and a convex image-side surface 1032, the object-side and image-side surfaces 1031 and 1032 thereof being aspheric; and a fourth lens element 1040 made of plastic with negative refractive power having a convex object-side surface 1041 and a concave image-side surface 1042, the object-side and image-side surfaces 1041 and 1042 thereof being aspheric, and at least one inflection point is formed on both the object-side surface 1041 and the image-side surface 1042 thereof;

wherein an aperture stop 1000 is disposed between the first lens element 1010 and the second lens element 1020;

the image capturing lens system further comprises an IR filter 1050 disposed between the image-side surface 1042 of the fourth lens element 1040 and an image plane 1070, and the IR filter 1050 is made of glass and has no influence on the focal length of the image capturing lens system; the image capturing lens system further comprises an image sensor 1060 provided on the image plane 1070.

The detailed optical data of the tenth embodiment is shown in TABLE 27, and the aspheric surface data is shown in TABLE 28, wherein the units of the radius of curvature, the thickness and the focal length are expressed in mm, and HFOV is half of the maximal field of view.

TABLE 27

(Embodiment 10)
f = 3.60 mm, Fno = 2.50, HFOV = 37.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.634060 | (ASP) | 0.473 | Plastic | 1.544 | 55.9 | 2.95 |
| 2 | | −83.275100 | (ASP) | 0.025 | | | | |
| 3 | Ape. Stop | Plano | | 0.069 | | | | |
| 4 | Lens 2 | 3.872000 | (ASP) | 0.220 | Plastic | 1.634 | 23.8 | −4.66 |
| 5 | | 1.638780 | (ASP) | 0.516 | | | | |
| 6 | Lens 3 | −7.556800 | (ASP) | 0.605 | Plastic | 1.544 | 55.9 | 6.31 |
| 7 | | −2.426490 | (ASP) | 0.823 | | | | |
| 8 | Lens 4 | 1.722160 | (ASP) | 0.638 | Plastic | 1.583 | 30.2 | −9.68 |
| 9 | | 1.139610 | (ASP) | 0.500 | | | | |
| 10 | IR-filter | Plano | | 0.300 | Glass | 1.516 | 64.1 | — |
| 11 | | Plano | | 0.304 | | | | |
| 12 | Image | Plano | | — | | | | |

* Reference wavelength is 587.6 nm (d-line)

TABLE 28

Aspheric Coefficients

| | Surface # | | | | | | | |
|---|---|---|---|---|---|---|---|---|
| | 1 | 2 | 4 | 5 | 6 | 7 | 8 | 9 |
| k = | −8.88423E+00 | −1.00000E+00 | −1.17781E+00 | −6.11416E+00 | 9.99457E−01 | −1.38091E−01 | −1.70597E+00 | −3.53932E+00 |
| A4 = | 2.34500E−01 | −2.39612E−02 | −1.26095E−01 | 6.64457E−02 | −1.33159E−01 | −2.14916E−01 | −3.09771E−01 | −1.44358E−01 |
| A6 = | −1.58644E−01 | 1.34833E−01 | 1.80874E−01 | 9.74938E−02 | 8.33445E−02 | 2.66691E−01 | 1.24288E−01 | 6.45418E−02 |
| A8 = | −8.61042E−02 | −5.61738E−01 | 2.95093E−01 | 9.11145E−02 | −1.92901E−01 | −4.86813E−01 | −5.27890E−02 | −2.32298E−02 |
| A10 = | 3.95937E−01 | 1.77392E+00 | −2.06698E−01 | −7.31622E−01 | 3.05608E−01 | 5.23144E−01 | 1.61661E−02 | 4.88684E−03 |
| A12 = | −1.82584E−01 | −3.12783E+00 | 4.20390E−01 | 1.50537E+00 | −5.00057E−01 | −3.03085E−01 | −2.30225E−03 | −5.54207E−04 |
| A14 = | −3.56220E−01 | 1.91363E+00 | −4.26889E+00 | −1.38102E+00 | 6.08376E−01 | 4.92746E−02 | 8.77015E−05 | 2.63641E−05 |
| A16 = | 2.68386E−01 | 2.40924E−01 | 1.72244E+00 | 4.01925E−01 | −2.47089E−01 | 1.84033E−02 | | |

The equation of the aspheric surface profiles of the tenth embodiment has the same form as that of the first embodiment. Moreover, the description of the factors in the relations is as those set forth in the first embodiment, but the values of the relations of the tenth embodiment are listed in the following TABLE 29.

TABLE 29

(Embodiment 10)

| | | | |
|---|---|---|---|
| f | 3.60 | Ds/D12 | 0.63 |
| FNO | 2.50 | T34/CT3 | 1.36 |
| HFOV | 37.0 | T34/CT4 | 1.29 |
| V1 − V2 | 32.1 | CT1/CT2 | 2.15 |
| \|f/f3\| | 0.57 | R8/R7 | 0.66 |
| R2/f | −23.17 | TTL/ImgH | 1.59 |
| f/R3 | 0.93 | | |

Embodiment 11

Figure 11A:
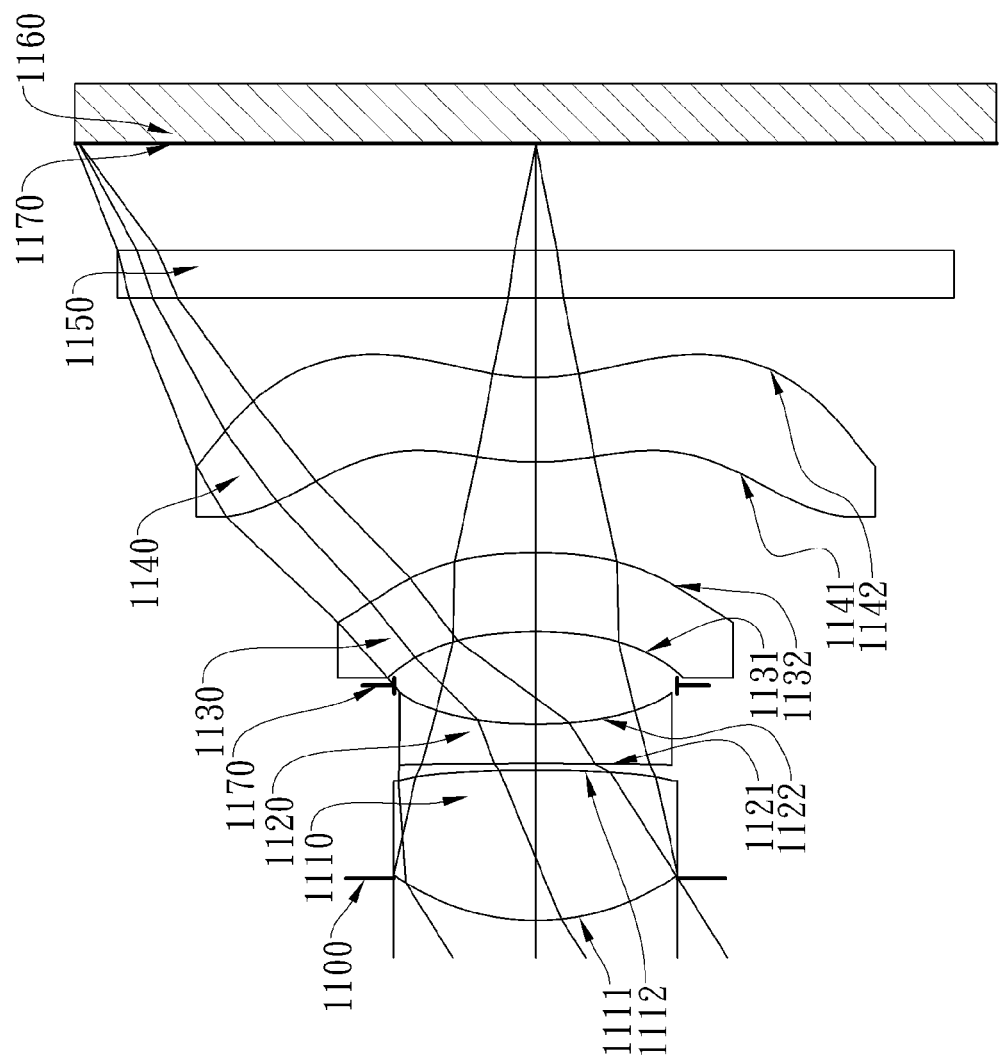
FIG. 11A shows an image capturing lens system in accordance with an eleventh embodiment of the present invention.
Figure 11B:
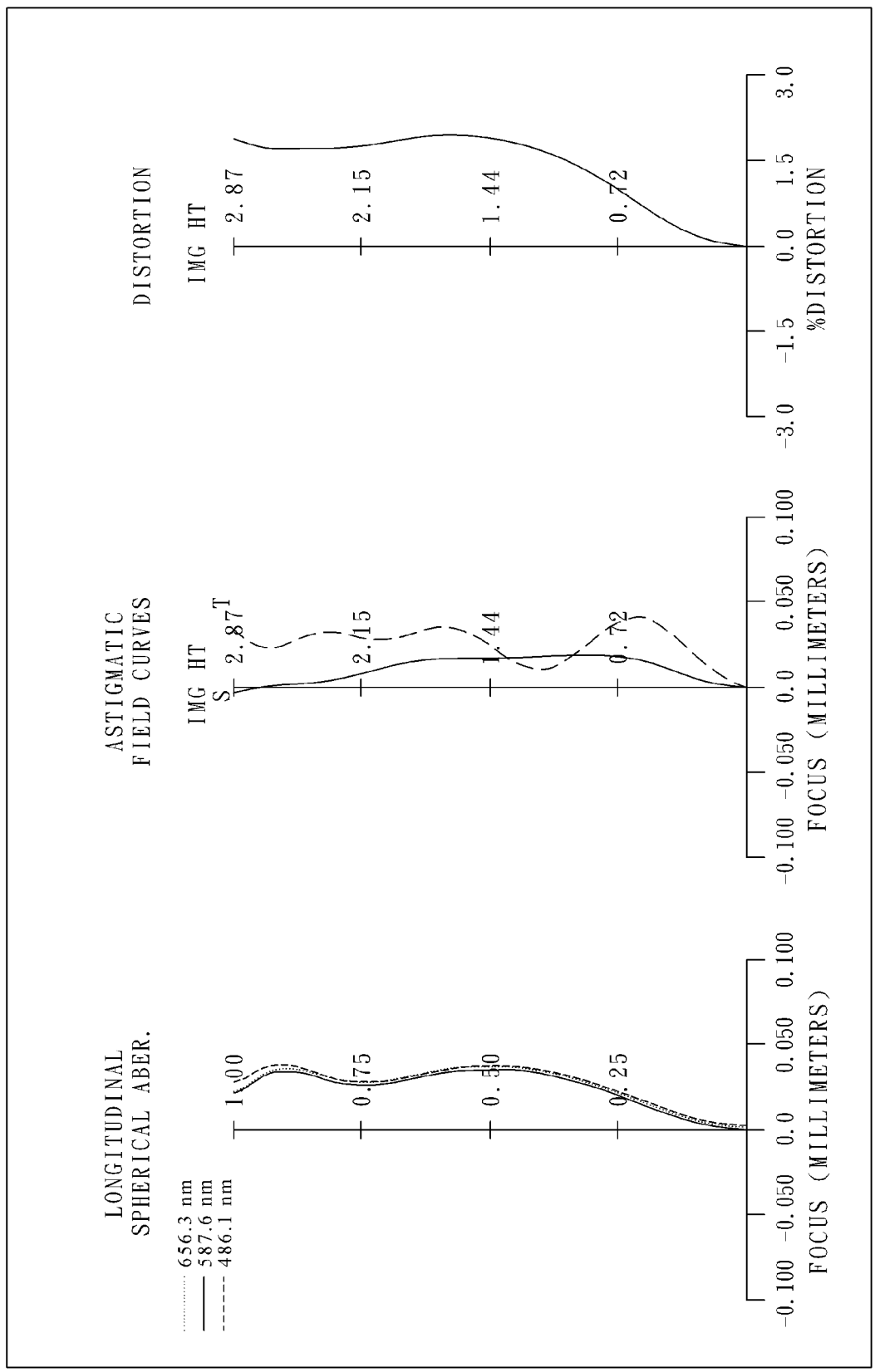
FIG. 11B shows the aberration curves of the eleventh embodiment of the present invention.

FIG. 11A shows an image capturing lens system in accordance with the eleventh embodiment of the present invention, and FIG. 11B shows the aberration curves of the eleventh embodiment of the present invention. The image capturing lens system of the eleventh embodiment of the present invention mainly comprises four non-cemented lens elements, in order from an object side to an image side:

a first lens element 1110 made of plastic with positive refractive power having a convex object-side surface 1111 and a convex image-side surface 1112, the object-side and image-side surfaces 1111 and 1112 thereof being aspheric;

a second lens element 1120 made of plastic with negative refractive power having a concave object-side surface 1121 and a concave image-side surface 1122, the object-side and image-side surfaces 1121 and 1122 thereof being aspheric;

a third lens element 1130 made of plastic with negative refractive power having a concave object-side surface 1131 and a convex image-side surface 1132, the object-side and image-side surfaces 1131 and 1132 thereof being aspheric; and a fourth lens element 1140 made of plastic with negative refractive power having a convex object-side surface 1141 and a concave image-side surface 1142, the object-side and image-side surfaces 1141 and 1142 thereof being aspheric, and at least one inflection point is formed on both the object-side surface 1141 and the image-side surface 1142 thereof;

wherein an aperture stop 1100 is disposed between an imaged object and the first lens element 1110; moreover, a stop 1170 is disposed between the second lens element 1120 and the third lens element 1130;

the image capturing lens system further comprises an IR filter 1150 disposed between the image-side surface 1142 of the fourth lens element 1140 and an image plane 1170, and the IR filter 1150 is made of glass and has no influence on the focal length of the image capturing lens system; the image capturing lens system further comprises an image sensor 1160 provided on the image plane 1170.

The detailed optical data of the eleventh embodiment is shown in TABLE 30, and the aspheric surface data is shown in TABLE 31, wherein the units of the radius of curvature, the thickness and the focal length are expressed in mm, and HFOV is half of the maximal field of view.

TABLE 30

(Embodiment 11)
f = 4.47 mm, Fno = 2.50, HFOV = 32.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.267 | | | | |
| 2 | Lens 1 | 1.484480 | (ASP) | 0.948 | Plastic | 1.544 | 55.9 | 2.39 |
| 3 | | −8.020000 | (ASP) | 0.040 | | | | |
| 4 | Lens 2 | −20.816600 | (ASP) | 0.250 | Plastic | 1.640 | 23.3 | −3.70 |
| 5 | | 2.687510 | (ASP) | 0.242 | | | | |
| 6 | | Plano | | 0.338 | | | | |
| 7 | Lens 3 | −2.714580 | (ASP) | 0.497 | Plastic | 1.640 | 23.3 | −57.71 |
| 8 | | −3.139300 | (ASP) | 0.572 | | | | |
| 9 | Lens 4 | 1.675140 | (ASP) | 0.532 | Plastic | 1.544 | 55.9 | −43.89 |
| 10 | | 1.390170 | (ASP) | 0.500 | | | | |
| 11 | IR-filter | Plano | | 0.300 | Glass | 1.516 | 64.1 | — |
| 12 | | Plano | | 0.673 | | | | |
| 13 | Image | Plano | | — | | | | |

\* Reference wavelength is 587.6 nm (d-line)
half of an effective radius of the stop at surface 6 is 0.89 mm

TABLE 31

Aspheric Coefficients

| | Surface # | | | | | | | |
|---|---|---|---|---|---|---|---|---|
| | 2 | 3 | 4 | 5 | 7 | 8 | 9 | 10 |
| k = | −8.11937E−01 | 1.71037E+01 | 9.52800E+01 | −2.20050E+01 | 6.00641E+00 | −3.40456E+01 | −6.60094E+00 | −4.52613E+00 |
| A4 = | 1.56425E−02 | 1.58107E−02 | 3.97654E−02 | 1.87173E−01 | −1.74767E−01 | −3.73038E−01 | −2.46727E−01 | −1.75824E−01 |
| A6 = | 6.47889E−02 | −2.38810E−02 | 4.81220E−03 | −5.39089E−02 | 3.57886E−01 | 3.91514E−01 | 7.35557E−02 | 7.32170E−02 |
| A8 = | −2.41681E−01 | −7.92954E−02 | −7.77967E−02 | −1.06290E−01 | −1.15608E+00 | −3.58871E−01 | −7.12087E−03 | −2.38863E−02 |
| A10 = | 6.07479E−01 | 2.90103E−01 | 4.45609E−01 | 8.39435E−01 | 2.22283E+00 | 1.54522E−01 | 2.05192E−04 | 4.21842E−03 |

TABLE 31-continued

Aspheric Coefficients

| | Surface # | | | | | | | |
|---|---|---|---|---|---|---|---|---|
| | 2 | 3 | 4 | 5 | 7 | 8 | 9 | 10 |
| A12 = | −9.47937E−01 | −9.43262E−01 | −1.54609E+00 | −1.63419E+00 | −2.34596E+00 | 4.53333E−02 | −4.37080E−06 | −9.44743E−05 |
| A14 = | 7.79368E−01 | 1.14564E+00 | 1.92714E+00 | 1.37236E+00 | 1.42150E+00 | −5.04446E−02 | −1.89178E−05 | −9.76173E−05 |
| A16 = | −2.64478E−01 | −4.57426E−01 | −7.84276E−01 | −3.30834E−01 | −4.06369E−01 | 8.56125E−03 | 3.62066E−06 | 1.18045E−05 |

The equation of the aspheric surface profiles of the eleventh embodiment has the same form as that of the first embodiment. Moreover, the description of the factors in the relations is as those set forth in the first embodiment, but the values of the relations of the eleventh embodiment are listed in the following TABLE 32.

TABLE 32

(Embodiment 11)

| f | 4.47 | Ds/D12 | 0.22 |
|---|---|---|---|
| FNO | 2.50 | T34/CT3 | 1.12 |
| HFOV | 32.1 | T34/CT4 | 1.08 |
| V1 − V2 | 32.6 | CT1/CT2 | 3.79 |
| |f/f3| | 0.08 | R8/R7 | 0.83 |
| R2/f | −1.80 | TTL/ImgH | 1.67 |
| f/R3 | −0.21 | | |

It is to be noted that TABLES 1-32 show different data of the different embodiments, however, the data of the different embodiments are obtained from experiments. Therefore, any image capturing lens system of the same structure is considered to be within the scope of the present invention even if it uses different data. The embodiments depicted above and the appended drawings are exemplary and are not intended to limit the scope of the present invention.

What is claimed is:

1. An image capturing lens system, in order from an object side to an image side comprising:
   a first lens element with positive refractive power having a convex object-side surface;
   a second lens element with negative refractive power having a concave image-side surface;
   a plastic third lens element with refractive power having a concave object-side surface and a convex image-side surface, both the object-side and image-side surfaces thereof being aspheric; and
   a plastic fourth lens element with negative refractive power having a concave image-side surface, both the object-side and image-side surfaces thereof being aspheric, and at least one inflection point is formed on at least one of the object-side and image-side surfaces thereof,
   wherein a total number of lens elements with refractive power of the image capturing lens system is four and all the four lens elements with refractive power are non-cemented lenses;
   wherein the image capturing lens system comprises a stop positioned between the first lens element and the second lens element;
   wherein an axial distance between the third lens element and the fourth lens element is T34, a central thickness of the third lens element is CT3, a central thickness of the fourth lens element is CT4, an axial distance between the object-side surface of the first lens element and the stop is Ds, an axial distance between the object-side surface of the first lens element and the image-side surface of the second lens element is D12, and they satisfy the following relations:

$1.1 < T34/CT3 < 3.3$;

$0.8 < T34/CT4 < 3.5$; and $0.35 < Ds/D12 < 0.9$.

2. The image capturing lens system according to claim 1, wherein the first lens element has a convex image-side surface.

3. The image capturing lens system according to claim 2, wherein a central thickness of the first lens element is CT1, a central thickness of the second lens element is CT2, and they satisfy the following relation:

$1.0 < CT1/CT2 < 4.5$.

4. The image capturing lens system according to claim 2, wherein an Abbe number of the first lens element is V1, an Abbe number of the second lens element is V2, and they satisfy the following relation:

$30 < V1 - V2 < 42$.

5. The image capturing lens system according to claim 3, wherein a curvature radius of the image-side surface of the first lens element is R2, a focal length of the image capturing lens system is f, and they satisfy the following relation:

$R2/f < -2.0$.

6. The image capturing lens system according to claim 3, wherein a curvature radius of the image-side surface of the fourth lens element is R8, a curvature radius of the object-side surface of the fourth lens element is R7, and they satisfy the following relation:

$-2.0 < R8/R7 < 0$.

7. The image capturing lens system according to claim 1, comprises an image plane, an axial distance between the object-side surface of the first lens element and the image plane is TTL, the maximum image height of the image capturing lens system is ImgH, and they satisfy the following relation:

$TTL/ImgH < 1.9$.

8. The image capturing lens system according to claim 7, wherein a focal length of the image capturing lens system is f, a curvature radius of the object-side surface of the second lens element is R3, and they satisfy the following relation:

$-1.3 < f/R3 < 0$.

9. The image capturing lens system according to claim 7, wherein a focal length of the image capturing lens system is f, a focal length of the third lens element is f3, and they satisfy the following relation:

$|f/f3| < 0.8$.

10. The image capturing lens system according to claim 7, wherein a curvature radius of the image-side surface of the fourth lens element is R8, a curvature radius of the object-side surface of the fourth lens element is R7, and they satisfy the following relation:

$$-2.0 < R8/R7 < 0.$$

11. The image capturing lens system according to claim 1, wherein a focal length of the image capturing lens system is f, a focal length of the third lens element is f3, and they satisfy the following relation:

$$0.3 < |f/f3| < 0.8.$$

12. The image capturing lens system according to claim 1, wherein a curvature radius of the image-side surface of the fourth lens element is R8, a curvature radius of the object-side surface of the fourth lens element is R7, and they satisfy the following relation:

$$-0.5 < R8/R7 < 0.$$

13. An image capturing lens system, in order from an object side to an image side comprising:
    a first lens element with positive refractive power having a convex object-side surface;
    a second lens element with negative refractive power having a concave object-side surface and a concave image-side surface;
    a plastic third lens element with refractive power having a concave object-side surface and a convex image-side surface, both the object-side and image-side surfaces thereof being aspheric; and
    a plastic fourth lens element with negative refractive power having a concave object-side surface and a concave image-side surface, both the object-side and image-side surfaces thereof being aspheric, and at least one inflection point is formed on at least one of the object-side and image-side surfaces thereof,
    wherein a total number of lens elements with refractive power of the image capturing lens system is four and all the four lens elements with refractive power are non-cemented lenses;
    wherein an axial distance between the third lens element and the fourth lens element is T34, a central thickness of the third lens element is CT3, a curvature radius of the image-side surface of the fourth lens element is R8, a curvature radius of the object-side surface of the fourth lens element is R7, a central thickness of the first lens element is CT1, a central thickness of the second lens element is CT2, and they satisfy the following relations:

$$1.1 < T34/CT3 < 3.3;$$

$$-2.0 < R8/R7 < 0; \text{ and}$$

$$1.0 < CT1/CT2 < 4.5.$$

14. The image capturing lens system according to claim 13, wherein the first lens element has a convex image-side surface.

15. The image capturing lens system according to claim 13, wherein an axial distance between the third lens element and the fourth lens element is T34, a central thickness of the fourth lens element is CT4, and they satisfy the following relation:

$$0.8 < T34/CT4 < 3.5.$$

16. The image capturing lens system according to claim 13, further comprising a stop positioned between the first lens element and the second lens element, wherein an axial distance between the object-side surface of the first lens element and the stop is Ds, an axial distance between the object-side surface of the first lens element and the image-side surface of the second lens element is D12, and they satisfy the following relation:

$$0.35 < Ds/D12 < 0.9.$$

17. The image capturing lens system according to claim 13, wherein the curvature radius of the image-side surface of the fourth lens element is R8, the curvature radius of the object-side surface of the fourth lens element is R7, and they satisfy the following relation:

$$-0.5 < R8/R7 < 0.$$

18. The image capturing lens system according to claim 13, wherein a focal length of the image capturing lens system is f, a focal length of the third lens element is f3, and they satisfy the following relation:

$$0.3 < |f/f3| < 0.8.$$

19. An image capturing lens system, in order from an object side to an image side comprising:
    a first lens element with positive refractive power having a convex object-side surface;
    a second lens element with negative refractive power having a concave object-side surface and a concave image-side surface;
    a plastic third lens element with refractive power having a concave object-side surface and a convex image-side surface, both the object-side and image-side surfaces thereof being aspheric; and
    a plastic fourth lens element with negative refractive power having a concave object-side surface and a concave image-side surface, both the object-side and image-side surfaces thereof being aspheric, and at least one inflection point is formed on at least one of the object-side and image-side surfaces thereof,
    wherein a total number of lens elements with refractive power of the image capturing lens system is four and all the four lens elements with refractive power are non-cemented lenses;
    wherein the image capturing lens system comprises a stop positioned between the first lens element and the second lens element;
    wherein an axial distance between the third lens element and the fourth lens element is T34, a central thickness of the third lens element is CT3, a central thickness of the first lens element is CT1, a central thickness of the second lens element is CT2, an axial distance between the object-side surface of the first lens element and the stop is Ds, an axial distance between the object-side surface of the first lens element and the image-side surface of the second lens element is D12, and they satisfy the following relations:

$$1.1 < T34/CT3 < 3.3;$$

$$1.0 < CT1/CT2 < 4.5; \text{ and}$$

$$0.35 < Ds/D12 < 0.9.$$

20. The image capturing lens system according to claim 19, wherein the first lens element has a convex image-side surface.

21. The image capturing lens system according to claim 19, wherein an Abbe number of the first lens element is V1, an Abbe number of the second lens element is V2, and they satisfy the following relation:

$$30 < V1 - V2 < 42.$$

22. The image capturing lens system according to claim 19, wherein a curvature radius of the image-side surface of the fourth lens element is R8, a curvature radius of the object-side surface of the fourth lens element is R7, and they satisfy the following relation:

$-2.0 < R8/R7 < 0.$

23. The image capturing lens system according to claim 19, wherein an axial distance between the third lens element and the fourth lens element is T34, a central thickness of the fourth lens element is CT4, and they satisfy the following relation:

$0.8 < T34/CT4 < 3.5.$

24. The image capturing lens system according to claim 19, comprises an image plane, an axial distance between the object-side surface of the first lens element and the image plane is TTL, the maximum image height of the image capturing lens system is ImgH, and they satisfy the following relation:

$TTL/ImgH < 1.9.$

* * * * *